(12) United States Patent
Arita et al.

(10) Patent No.: US 10,501,593 B2
(45) Date of Patent: Dec. 10, 2019

(54) DOPE COMPOSITION, POLARIZING PLATE PROTECTIVE FILM, POLARIZING PLATE PROTECTIVE FILM MANUFACTURING METHOD, POLARIZING PLATE, AND LIQUID CRYSTAL DISPLAY DEVICE

(71) Applicant: FUJIFILM Corporation, Tokyo (JP)

(72) Inventors: Shusuke Arita, Kanagawa (JP); Yutaka Nozoe, Kanagawa (JP); Katsumi Sasata, Kanagawa (JP); Hajime Nakayama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 379 days.

(21) Appl. No.: 15/188,367

(22) Filed: Jun. 21, 2016

(65) Prior Publication Data

US 2016/0297939 A1    Oct. 13, 2016

Related U.S. Application Data

(63) Continuation of application No. PCT/JP2014/083509, filed on Dec. 18, 2014.

(30) Foreign Application Priority Data

Dec. 27, 2013  (JP) .................................. 2013-271240

(51) Int. Cl.
*C08L 33/12* (2006.01)
*C08J 5/18* (2006.01)
(Continued)

(52) U.S. Cl.
CPC ................. *C08J 5/18* (2013.01); *B29C 41/28* (2013.01); *B29D 11/00644* (2013.01);
(Continued)

(58) Field of Classification Search
CPC ...... C08J 5/18; G02B 1/14; C08K 5/13; C08K 5/1345; C08L 33/12
See application file for complete search history.

(56) References Cited

U.S. PATENT DOCUMENTS

2002/0086163 A1* 7/2002 Shimizu ................. G02B 1/105
428/424.4
2014/0128547 A1* 5/2014 Yonemura ............ C08F 222/40
525/205

FOREIGN PATENT DOCUMENTS

JP   2007-118266 A   5/2007
JP   2011-053596 A   3/2011
(Continued)

OTHER PUBLICATIONS

Rainer Wolf & Bansi Lal Kaul, "Plastics, Additives" Ullmann's Encyclopedia of Industrial Chemistry, vol. 27, 619-671, published in 2000. (Year: 2000).*
(Continued)

*Primary Examiner* — Nicholas E Hill
(74) *Attorney, Agent, or Firm* — Edwards Neils LLC; Jean C. Edwards, Esq.

(57) ABSTRACT

A dope composition containing an acrylic resin having a weight average molecular weight of greater than or equal to 250,000; and an additive having a weight average molecular weight of less than 50,000, in which the acrylic resin includes a methyl methacrylate unit (a), and a mass fraction of an alkyl (meth)acrylate unit (b) other than methyl methacrylate is less than 5 mass %, has excellent manufacturing aptitude from the viewpoint of having a high drying speed and large breaking elongation at a time point of forming an un-stretched film, and enabling a crack at the time of being stretched to be suppressed, has a low haze value and an excellent surface shape at the time of preparing a polarizing plate protective film, and has excellent heat resistance; a
(Continued)

polarizing plate protective film; a polarizing plate protective film manufacturing method; a polarizing plate; and a liquid crystal display device.

8 Claims, 1 Drawing Sheet

(51) Int. Cl.
| | |
|---|---|
| B29C 41/28 | (2006.01) |
| G02B 5/30 | (2006.01) |
| C08F 220/14 | (2006.01) |
| G02B 1/14 | (2015.01) |
| B29D 11/00 | (2006.01) |
| G02F 1/1335 | (2006.01) |
| C08K 5/13 | (2006.01) |
| B29K 33/00 | (2006.01) |
| C08K 5/134 | (2006.01) |
| C08K 5/3492 | (2006.01) |

(52) U.S. Cl.
CPC ............ *C08F 220/14* (2013.01); *C08L 33/12* (2013.01); *G02B 1/14* (2015.01); *G02B 5/3025* (2013.01); *G02F 1/133528* (2013.01); *B29K 2033/12* (2013.01); *C08J 2333/12* (2013.01); *C08K 5/13* (2013.01); *C08K 5/1345* (2013.01); *C08K 5/34924* (2013.01); *C08L 2203/206* (2013.01); *G02B 5/3033* (2013.01)

(56) References Cited

FOREIGN PATENT DOCUMENTS

| | | | |
|---|---|---|---|
| JP | 2012-237818 A | 12/2012 | |
| JP | 2013-023523 A | 2/2013 | |
| WO | WO-2012043872 A1 * | 4/2012 | ........... G02B 5/3083 |
| WO | WO-2013005634 A1 * | 1/2013 | ............ C08F 222/40 |

OTHER PUBLICATIONS

International Search Report issued in connection with International Patent Application No. PCT/JP2014/083509 dated Jan. 27, 2015.
Written Opinion issued in connection with International Patent Application No. PCT/JP2014/083509 dated Jan. 27, 2015.
International Preliminary Report on Patentability issued by WIPO dated Jul. 7, 2016, in connection with International Patent Application No. PCT/JP2014/083509.

* cited by examiner

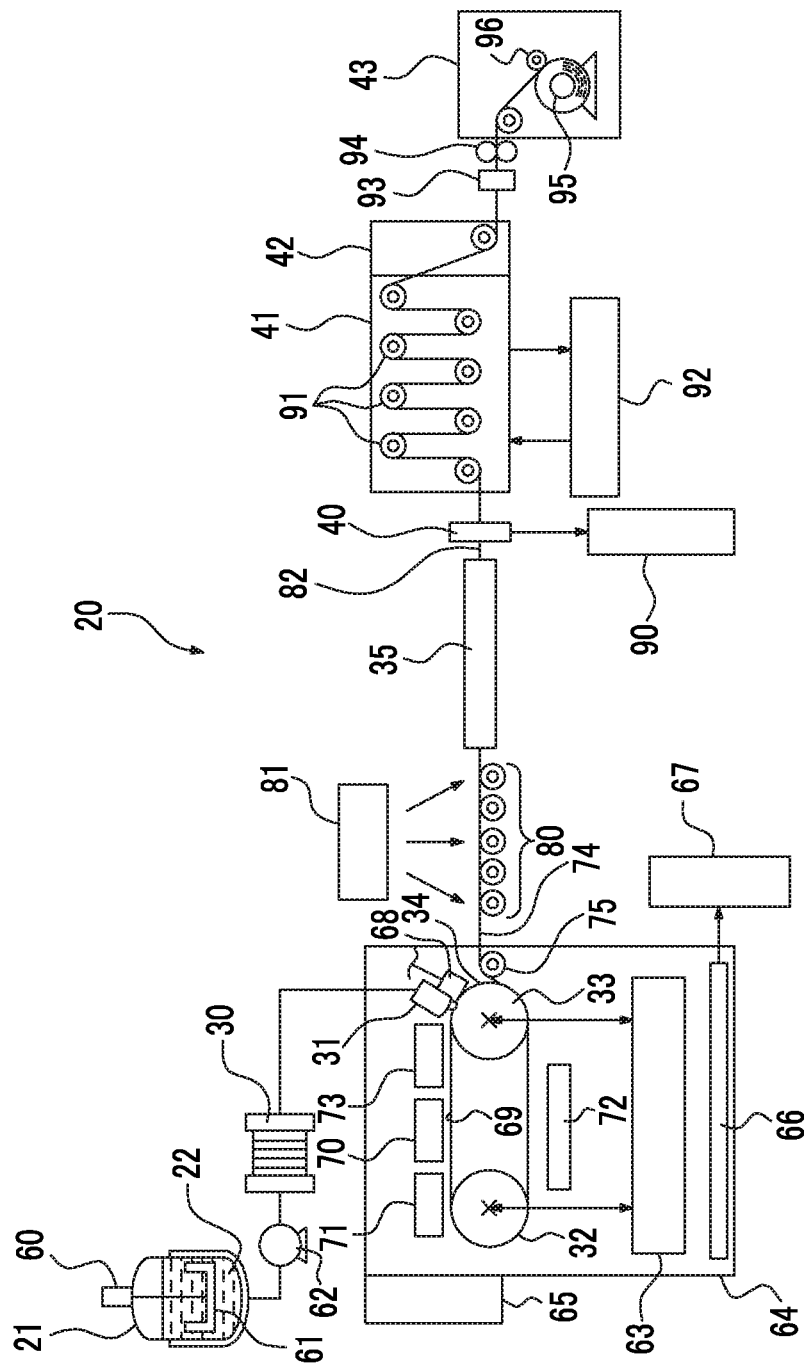

DOPE COMPOSITION, POLARIZING PLATE PROTECTIVE FILM, POLARIZING PLATE PROTECTIVE FILM MANUFACTURING METHOD, POLARIZING PLATE, AND LIQUID CRYSTAL DISPLAY DEVICE

CROSS-REFERENCE TO RELATED APPLICATIONS

This application is a Continuation of PCT International Application No. PCT/JP2014/083509, filed on Dec. 18, 2014, which was published under PCT Article 21(2) in Japanese, and claims priority under 35 U.S.C. Section 119(a) to Japanese Patent Application No. 2013-271240 filed on Dec. 27, 2013. The above applications are hereby expressly incorporated by reference, in their entirety, into the present application.

BACKGROUND OF THE INVENTION

1. Field of the Invention

The present invention relates to a dope composition, a polarizing plate protective film, a polarizing plate protective film manufacturing method, a polarizing plate, and a liquid crystal display device.

2. Description of the Related Art

A demand for using a liquid crystal display device as a liquid crystal display or the like of a liquid crystal television or a personal computer has increased. In general, a liquid crystal display device is configured of a liquid crystal cell in which a transparent electrode, a liquid crystal layer, a color filter, and the like are interposed between glass plates, and two polarizing plates disposed on both sides thereof, and each of the polarizing plates has a configuration in which a polarizer (also referred to as a polarizing film and a polarizing film) is interposed between two optical films (polarizing plate protective films). In general, a cellulose triacetate film is used as the polarizing plate protective film.

On the other hand, the size of the liquid crystal display device has been rapidly enlarged, and the application of the liquid crystal display device has been diversified according to advancements in the recent technology. For example, the liquid crystal display device is used as a large display which is disposed on the street or in front of a store, a display for advertisement in a public place using a display device which is referred to as digital signage, and the like.

In such application, the liquid crystal display device is assumed to be used outside, and thus, deterioration due to moisture absorption of the polarizing film becomes a problem, and the polarizing plate protective film has been required to have low moisture permeability. However, it is difficult to sufficiently decrease moisture permeability of a cellulose ester film such as a cellulose triacetate film which has been used in the related art, and in a case where the thickness of the film is reduced in order to obtain low moisture permeability, an optical influence increases. Further, recently, a device has been required to be thin, and thus, an increase in the thickness of the polarizing plate itself also becomes a problem.

On the other hand, polymethyl methacrylate (hereinafter, simply referred to as PMMA) which is a representative of an acrylic resin exhibits excellent transparency or excellent dimensional stability in addition to low moisture permeability, and thus, has been preferably used in an optical film as an optical film material having low moisture permeability compared to the cellulose ester film.

In general, such an acrylic film is manufactured by a melting film formation method.

In general, an acrylic resin having a weight average molecular weight of approximately 50,000 to 150,000 is used as the acrylic resin used in the melting film formation method. This is because in a case where the weight average molecular weight of the acrylic resin is less than 50,000, the resin film becomes vulnerable, and in contrast, in a case where the weight average molecular weight of the acrylic resin is greater than 150,000, fluidity is not obtained even in a case of heating a dope, and thus, it is difficult to perform film formation in the shape of a film in both cases.

On the other hand, a solution film formation method using a solution in which a resin is dissolved (a dope composition) as a liquid material for forming a casting film has been known as a film formation method other than the melting film formation method.

For example, in JP2007-118266A, a manufacturing method of an acrylic film is disclosed in which in a case where a film is formed of an acrylic resin having a mass average molecular weight of 80,000 to 150,000 by using a solution film formation method, a PET film is arranged around an acrylic film as a support until the acrylic film is dried to have self-supporting properties, and then, the acrylic film is peeled off.

SUMMARY OF THE INVENTION

However, the present inventors have conducted actual evaluation with respect to the dope composition of the related art which is used in the solution film formation method, and have found that the dope composition using an acrylic resin having a comparatively small weight average molecular weight of 80,000 to 150,000 has low viscosity, at the time of being ejected from a cutting edge of a casting die which is used in the solution film formation, and thus, a problem on production such as easy occurrence of streaks increases. In addition, an un-stretched film of the acrylic resin having a low molecular weight as described above has small breaking elongation and easily cracks. Further, it has also been found that the acrylic resin is a polymer having a small diffusion coefficient, and thus, it takes time to dry the casting film.

Therefore, in order to solve such problems of the related art, the present inventors have conducted studies to provide a dope composition in which viscosity of a dope is high, a casting film of the dope is able to be dried at a high speed, breaking elongation is large in a case of forming a film, and a crack at the time of being stretched is suppressed. Further, the present inventors have conducted studies to provide a polarizing plate protective film having an excellent surface shape, a polarizing plate protective film manufacturing method having high productivity, and, a polarizing plate and a liquid crystal display device including the polarizing plate protective film.

An object of the present invention is to provide a dope composition having excellent manufacturing aptitude from the viewpoint of having a high drying speed and large breaking elongation at a time point of forming an un-stretched film, and enabling a crack at the time of being stretched to be suppressed. In addition, another object of the present invention is to provide a dope composition having a low haze value and an excellent surface shape at the time of preparing a polarizing plate protective film, and excellent heat resistance.

As a result of intensive studies of the present inventors for attaining the objects described above, the following findings (1), (2), and (3) have been obtained.

(1) By setting the weight average molecular weight of the acrylic resin to be greater than or equal to 250,000, it is possible to increase viscosity of the dope at a comparatively low concentration.

(2) By setting the weight average molecular weight of the acrylic resin to be greater than or equal to 250,000, breaking elongation at the time of being un-stretched increases.

(3) By adding an additive having a weight average molecular weight of less than 50,000, drying is accelerated.

The present invention has been completed on the basis of the findings described above, and specifically, has the following configurations.

[1] A dope composition, containing an acrylic resin having a weight average molecular weight of greater than or equal to 250,000; and an additive having a weight average molecular weight of less than 50,000, in which the acrylic resin includes a methyl methacrylate unit (a), and a mass fraction of an alkyl (meth)acrylate unit (b) other than methyl methacrylate is less than 5 mass %.

[2] The dope composition according to [1], in which the acrylic resin is formed of an alkyl (meth)acrylate unit, and a mass fraction of the methyl methacrylate unit (a) is greater than or equal to 95 mass %.

[3] The dope composition according to [1] or [2], in which the acrylic resin is formed of the methyl methacrylate unit (a).

[4] The dope composition according to any one of [1] to [3], in which the additive is contained in the amount of greater than or equal to 5 parts by mass with respect to 100 parts by mass of the acrylic resin.

[5] The dope composition according to any one of [1] to [4], in which the additive contains a phenol-based compound d noted by General Formula (1) described below.

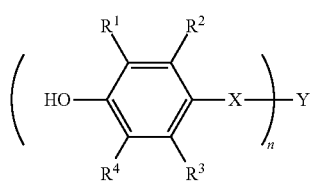

General Formula (1)

[In General Formula (1), $R^1$ and $R^4$ each independently represent a hydrogen atom, a methyl group, or a t-butyl group, $R^2$ and $R^3$ each independently represent a hydrogen atom or a methyl group; X represents a single bond, or a divalent organic group selected from $-CH_2-$, $-CO-$, $-O-$, and $-NR^5-$ or a divalent organic group formed of a combination of two or more groups selected from the group consisting of $-CH_2-$, $-CO-$, $-O-$, and $-NR^5-$, $R^5$ represents a hydrogen atom or an alkyl group; Y represents a hydrogen atom, a carbon atom, a sulfur atom, an aromatic hydrocarbon group, or a hetero ring; and n represents an integer of 1 to 4.]

[6] The dope composition according to any one of [1] to [5], in which the additive contains a styrene-based copolymer having a structure unit denoted by General Formula (2) described below and a structure unit denoted by General Formula (3) or (4) described below.

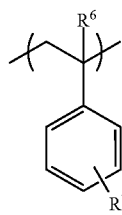

General Formula (2)

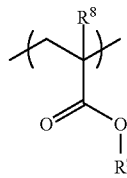

General Formula (3)

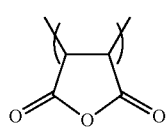

General Formula (4)

[In General Formula (2), $R^6$ represents a hydrogen atom or an alkyl group having 1 to 4 carbon atoms, and $R^7$ represents a hydrogen atom, a halogen atom, an alkyl group having 1 to 4 carbon atoms or an alkoxy group having 1 to 4 carbon atoms, and an alkyl carbonyl oxy group having 1 to 4 carbon atoms; and in General Formula (3), $R^8$ represents a hydrogen atom or a methyl group, and $R^9$ represents a hydrogen atom or an alkyl group having 1 to 20 carbon atoms.]

[7] The dope composition according to any one of [1] to [6], in which the additive contains a novolak resin having a structure unit denoted by General Formula (5) described below.

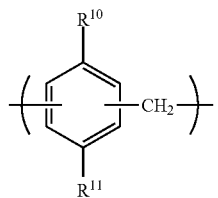

General Formula (5)

[In General Formula (5), $R^{10}$ represents a hydroxyl group or an alkoxy group having 1 to 12 carbon atoms, and $R^{11}$ represents a hydrogen atom or an alkyl group having 1 to 8 carbon atoms.]

[8] A polarizing plate protective film, comprising a polymer film obtained by performing film formation with respect to the dope composition according to any one of [1] to [7].

[9] The polarizing plate protective film according to [8], in which diffusion coefficients De and Dn defined by Expression (1) described below satisfy conditions of Expression (2) described below.

$$De=Pe/Se, Dn=Pn/Sn \quad \text{Expression (1)}$$

$$De/Dn>1 \quad \text{Expression (2)}$$

[In Expressions (1) and (2), Pe represents moisture permeability of the polarizing plate protective film, Se represents an equilibrium moisture content of the polarizing plate protective film at a temperature of 25° C. and relative humidity of 80%, Pn represents moisture permeability of an additive-free film which has the same configuration as that of the polarizing plate protective film except that the additive is not contained, and Se represents an equilibrium moisture content of the additive-free film at a temperature of 25° C. and relative humidity of 80%; and here, the moisture permeability is a value obtained by converting a value after being aged at a temperature of 40° C. and relative humidity of 90% for 24 hours into a film thickness of 40 μm using a method of JIS Z-0208.]

[10] The polarizing plate protective film according to [8] or [9], in which moisture permeability in terms of a film thickness of 40 Lm is less than or equal to 70 g/m²/day.

[11] A polarizing plate protective film manufacturing method, comprising a dissolving step of dissolving the dope composition according to any one of [1] to [7] in a solvent and preparing a dope; a casting step of casting the dope onto a metal support and forming a casting film; and a peeling step of drying the casting film, peeling off the casting film from the metal support, and then, obtaining a polymer film.

[12] A polarizing plate, comprising the polarizing plate protective film according to any one of [8] to [10].

[13] A liquid crystal display device, comprising the polarizing plate according to [12].

According to the dope composition of the present invention, the dope composition has excellent manufacturing aptitude from the viewpoint of having a high drying speed and large breaking elongation at a time point of forming an un-stretched film, and enabling a crack at the time of being stretched to be suppressed. In addition, the dope composition has a low haze value and an excellent surface shape at the time of preparing a polarizing plate protective film, and excellent heat resistance.

In addition, according to the polarizing plate protective film and the polarizing plate protective film manufacturing method of the present invention, the dope composition as described above is used, and thus, it is possible to obtain a polarizing plate protective film having an excellent surface shape and a low haze value with high productivity.

BRIEF DESCRIPTION OF THE DRAWINGS

FIG. 1 is a schematic view of a film manufacturing line for carrying out a solution film formation method.

DESCRIPTION OF THE PREFERRED EMBODIMENTS

Hereinafter, the present invention will be described in detail. The description of configuration requirements described below is based on representative embodiments or specific examples, but the present invention is not limited to the embodiments. Further, herein, a numerical range denoted by using "to" indicates a range including numerical values before and after "to" as the lower limit value and the upper limit value. In addition, (meth)acryl indicates methacryl or acryl. An acrylic resin used in the present invention indicates a (meth)acrylic resin, and also includes a methacryl resin.

<Dope Composition>

A dope composition is a resin solution which is molded into a polymer film by a solution film formation method.

A dope composition of the present invention contains an acrylic resin having a weight average molecular weight of greater than or equal to 250,000, and an additive having a weight average molecular weight of less than 50,000, the acrylic resin includes a methyl methacrylate unit (a), and the mass fraction of an alkyl (meth)acrylate unit (b) other than methyl methacrylate is less than 5 mass %.

Hereinafter, each component of the dope composition will be described.

[Acrylic Resin]

An acrylic resin which is used in the present invention contains an acrylic resin having a weight average molecular weight of greater than or equal to 250,000, and the additive having a weight average molecular weight of less than 50,000, and includes the methyl methacrylate unit (a), and the mass fraction of the alkyl (meth)acrylate unit (b) other than the methyl methacrylate is less than 5 mass %. The weight average molecular weight of the acrylic resin which is in such a range is higher than the weight average molecular weight of an acrylic resin which is used in a melting film formation, and the acrylic resin is suitable for solution film formation.

The acrylic resin includes the methyl methacrylate unit (a), and may or may not include the alkyl (meth)acrylate unit (b) other than the methyl methacrylate. Here, in a case where the acrylate resin includes the alkyl (meth)acrylate unit (b) other than the methyl methacrylate, the ratio is less than 5 mass %. The acrylic resin which is used in the present invention may be a homopolymer of methyl methacrylate without using other copolymerizable monomers. It is preferable that the acrylic resin is formed of the methyl methacrylate unit (a).

In a case where the acrylate resin includes the alkyl (meth)acrylate unit (b) other than the methyl methacrylate, examples of the alkyl (meth)acrylate unit (b) are able to include the following.

(Alkyl (Meth)Acrylate Unit (b) Other than Methyl Methacrylate)

Examples of the alkyl (meth)acrylate unit (b) other than the methyl methacrylate include acrylic acid ester (preferably alkyl acrylate in which an alkyl group has 1 to 18 carbon atoms) such as methyl acrylate, ethyl acrylate, n-butyl acrylate, isobutyl acrylate, t-butyl acrylate, cyclohexyl acrylate, and benzyl acrylate; methacrylic acid ester (preferably alkyl methacrylate in which an alkyl group has 2 to 18 carbon atoms) such as ethyl methacrylate, propyl methacrylate, n-butyl methacrylate, isobutyl methacrylate, t-butyl methacrylate, cyclohexyl methacrylate, and benzyl methacrylate; and the like, and only one type of the alkyl (meth)acrylate unit (b) may be used, or two or more types thereof may be used in combination.

(Other Configuration Units)

The acrylic resin which is used in the present invention may also include a configuration unit other than the alkyl (meth)acrylate units (a) and (b). Examples of such a configuration unit include an α,β-unsaturated acid such as an acrylic acid and a methacrylic acid, an unsaturated group-containing divalent carboxylic acid such as a maleic acid, a fumaric acid, and an itaconic acid, an aromatic vinyl compound such as styrene and α-methyl styrene, α,β-unsaturated nitrile such as acrylonitrile and methacrylonitrile, maleic anhydride, maleimide, N-substituted maleimide, glutaric anhydride, and the like. One type of the configuration unit may be independently introduced into the acrylic resin, or two or more types thereof may be introduced into the acrylic resin in combination.

Among them, from the viewpoint of thermal decomposition resistance or fluidity of a copolymer, methyl acrylate, ethyl acrylate, n-propyl acrylate, n-butyl acrylate, s-butyl acrylate, 2-ethyl hexyl acrylate, and the like are preferable, and the methyl acrylate or the n-butyl acrylate is particularly preferably used.

(Content Ratio of Methyl Methacrylate Unit (a))

In the acrylic resin, a content ratio of methyl methacrylate in a monomer component provided to a polymerization step is preferably 95 mass % to 100 mass %, is more preferably 97 mass % to 100 mass %, and is even more preferably 100 mass %, from the viewpoint of sufficiently exhibiting the effect of the present invention.

By setting the ratio of the methyl methacrylate to be greater than or equal to 95 mass %, an acrylic resin having high heat resistance is able to be obtained, and heat resistance of a polarizing plate protective film of the present invention to be obtained by using the dope composition of the present invention is able to be high.

In addition, the acrylic resin described above includes the methyl methacrylate unit (a), and the mass fraction of the alkyl (meth)acrylate unit (b) other than the methyl methacrylate is preferably less than 5 mass %, is more preferably less than 3 mass %, and is particularly preferably 0 mass %.

(Manufacturing Method of Acrylic Resin)

The acrylic resin which is able to be used in the dope composition of the present invention is available by a commercially available product or a known synthesis method.

Emulsion polymerization, solution polymerization, bulk polymerization, and suspension polymerization are able to be applied as a manufacturing method of the acrylic resin which is able to be used in the dope composition of the present invention. Among them, the emulsion polymerization and the suspension polymerization are more preferable from the viewpoint of manufacturing a polymer of the present invention.

An initiator which is used in general suspension polymerization is able to be used as an initiator of the suspension polymerization, and examples of the initiator include an organic peroxide and an azo compound.

A known suspension stabilizer which is generally used is also able to be used as a suspension stabilizer, and examples of the suspension stabilizer are able to include an organic colloidal polymer substance, an inorganic colloidal polymer substance, inorganic fine particles, and a combination of the substances and a surfactant.

(Weight Average Molecular Weight of Acrylic Resin)

In the present invention, the "weight average molecular weight" is a weight average molecular weight measured by gel chromatography.

A weight average molecular weight Mw of the acrylic resin which is used in the present invention is greater than or equal to 250,000. In a case the weight average molecular weight Mw of the acrylic resin is greater than or equal to 250,000, it is possible to increase the viscosity of the dope composition, and it is possible to suppress the occurrence of streaks on a casting film at the time of ejecting the casting film from a casting die even in a case where the concentration of the acrylic resin in the dope composition is low (for example, 10 mass %). In addition, in a case where the weight average molecular weight Mw of the acrylic resin is greater than or equal to 250,000, breaking elongation of an acrylic resin film at the time being un-stretched increases, and thus, handling aptitude at the time of manufacturing a film is excellent.

The weight average molecular weight Mw of the acrylic resin is preferably greater than or equal to 450,000, is more preferably greater than or equal to 500,000, and is even more preferably greater than or equal to 1,000,000, from the viewpoint of sufficiently exhibiting the effect of the present invention. The upper limit of the weight average molecular weight is not particularly determined, and it is preferable that the upper limit of the weight average molecular weight is less than or equal to 3,000,000 from the viewpoint of constraints of a polymerization process.

In the present invention, the "weight average molecular weight (Mw)" is a weight average molecular weight which is measured by gel permeation chromatography in the following conditions.

Solvent Tetrahydrofuran
Device Name TOSOH HLC-8220GPC
Column Using Three TOSOH TSK Gel Super HZM-H (4.6 mm×15 cm) in Connection.
Column Temperature 25° C.
Sample Concentration 0.1 mass %
Flow Rate 0.35 ml/min
Calibration Curve TSK Standard Polystyrene Manufactured by Tosoh Corporation, Using Calibration Curve of Seven Samples Having Mw of 2,800,000 to 1050.

(Glass Transition Temperature Tg of Acrylic Resin)

In the present invention, it is preferable that a glass transition temperature Tg of the acrylic resin is higher than or equal to 110° C. from the viewpoint of the manufacturing aptitude and the heat resistance. The glass transition temperature of the acrylic resin is preferably 110° C. to 200° C., is more preferably 115° C. to 150° C., and is particularly preferably 121° C. to 150° C.

Herein, the glass transition temperature Tg is obtained by using a dynamic viscoelasticity measuring instrument (DMA) described below. Dynamic viscoelasticity was measured by adjusting the humidity of a (un-stretched) film sample of the present invention of 5 mm×30 mm at a temperature of 25° C. and relative humidity of 60% for longer than or equal to 2 hours, and then, by using a dynamic viscoelasticity measuring instrument (VIBRON: DVA-225 (manufactured by ITK Co., Ltd.)) at a temperature rising rate of 2° C./minute, a measurement temperature range of 30° C. to 250° C., a frequency of 1 Hz, and a distance between chucks of 20 mm, and when a modulus of storage elasticity is set on a vertical axis as a logarithmic axis and a temperature (° C.) is set on a horizontal axis as a linear axis, and a rapid decrease in the modulus of storage elasticity which is observed at the time that the modulus of storage elasticity migrates from a solid region to a glass transition region is set to a straight line 1 in the solid region and a straight line 2 in the glass transition region, an intersection point between the straight line 1 and the straight line 2 is a temperature at which the modulus of storage elasticity rapidly decreases, and thus, the film starts to be softened at the time of increasing the temperature and is a temperature at which the modulus of storage elasticity starts to migrate to the glass transition region, and thus, is set to the glass transition temperature Tg (dynamic viscoelasticity).

(Concentration of Acrylic Resin)

The concentration of the acrylic resin in the dope composition is different according to the thickness of the polymer film which is planned to be formed, and the concentration of the acrylic resin is preferably 10 mass % to 40 mass %, is more preferably 10 mass % to 30 mass %, and is even more preferably 15 mass % to 25 mass %. Accordingly, it is possible to obtain a dope composition having suitable viscosity, and it is possible to obtain a polymer film having an excellent surface shape and a desirable thickness.

[Other Resins]

The dope composition of the present invention may contain resins other than the acrylic resin described above within a range not impairing the effect of the present invention.

Examples of such a resin are able to include an olefin-based thermoplastic resin such as polyethylene, polypropylene, an ethylene-propylene copolymer, and poly(4-methyl-1-pentene); a halogen-containing thermoplastic resin such as vinyl chloride and a chlorinated vinyl resin; an acrylic thermoplastic resin such as polymethyl methacrylate; a styrene-based thermoplastic resin such as polystyrene, a styrene-methyl methacrylate copolymer, a styrene-acrylonitrile copolymer, and an acrylonitrile-butadiene-styrene block copolymer; polyester such as polyethylene terephthalate, polybutylene terephthalate, and polyethylene naphthalate; polyamide such as nylon 6, nylon 66, and nylon 610; polyacetal; polycarbonate; polyphenylene oxide; polyphenylene sulfide; polyether ether ketone; polysulfone; polyether sulfone; polyoxy benzylene; polyamide imide; a rubber-like polymer such as an ABS resin or an ASA resin in which polybutadiene-based rubber or acrylic rubber is formulated, and the like. In the present invention, the resin other than the acrylic resin does not include a cellulose resin such as cellulose acylate.

In a case where the resin other than the acrylic resin is added to the dope composition, the resin to be added may be in a compatible state, or may be mixed without being dissolved.

[Additive]

The dope composition of the present invention contains an additive having a weight average molecular weight of less than 50,000 in order to accelerate drying of the casting film. A drying acceleration effect of such an additive is assumed that the glass transition temperature Tg of the casting film decreases and a drying temperature at a relative value with respect to Tg increases by adding an additive having a low molecular weight. In addition, compatibility between the acrylic resin and the additive is able to be obtained and an increase in haze of the film due to the additive is able to be avoided by setting the weight average molecular weight of the additive to be less than 50,000.

The additive may be a compound having a weight average molecular weight of less than 50,000, and examples of the additive are able to include a phenol-based compound, a styrene-based copolymer, a novolak resin, and the like as described below.

(Phenol-Based Compound)

For example, a phenol-based compound denoted by General Formula (1) described below is able to be used as the additive.

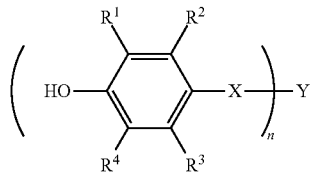

General Formula (1)

[In General Formula (1), $R^1$ and $R^4$ each independently represent a hydrogen atom, a methyl group, or a t-butyl group, and $R^2$ and $R^3$ each independently represent a hydrogen atom or a methyl group. X represents a single bond, or a divalent organic group selected from —$CH_2$—, —CO—, —O—, and —$NR^5$— or a divalent organic group formed of a combination of two or more groups selected from the group consisting of —$CH_2$—, —CO—, —O—, and —$NR^5$—, and $R^5$ represents a hydrogen atom or an alkyl group. Y represents a hydrogen atom, a carbon atom, a sulfur atom, an aromatic hydrocarbon group, or a hetero ring. n represents an integer of 1 to 4.]

$R^1$ and $R^4$ each independently represent a hydrogen atom, a methyl group, or a t-butyl group, is preferable the methyl group or the t-butyl group, and is more preferably the t-butyl group. The groups represented by $R^1$ and $R^4$ may be identical to each other or different from each other.

$R^2$ and $R^3$ each independently represent a hydrogen atom or a methyl group, and is preferably the hydrogen atom. The groups represented by $R^2$ and $R^3$ may be identical to each other or different from each other.

X represents a single bond, or a divalent organic group selected from —$CH_2$—, —CO—, —O—, and —$NR^5$— or a divalent organic group formed of a combination of two or more groups selected from the group consisting of —$CH_2$—, —CO—, —O—, and —$NR^5$—, is preferably the divalent organic group selected from —$CH_2$—, —CO—, —O—, and —$NR^5$— or the divalent organic group formed of a combination of two or more groups selected from the group consisting of —$CH_2$—, —CO—, —O—, and —$NR^5$—, and is more preferably a divalent organic group formed of a combination of two or more groups selected from —$CH_2$—, —CO—, and —O—.

$R^5$ represents a hydrogen atom or an alkyl group, and is preferably the hydrogen atom.

Y represents a hydrogen atom, a carbon atom, a sulfur atom, an aromatic hydrocarbon group, or a hetero ring, and is preferably the hydrogen atom.

n represents an integer of 1 to 4, and is preferably an integer of 1 or 2.

A commercially available product may be used as the phenol-based compound which is used in the present invention, and for example, SUMILIZER GA-80, SUMILIZER MDP-S, SUMILIZER BBM-S, SUMILIZER WX-R, and SUMILIZER WX-RC (manufactured by Sumitomo Chemical Company, Limited), IRGANOX 1010, IRGANOX 1010FF, IRGANOX 1035, IRGANOX 1035FF, IRGANOX 1076, IRGANOX 1076FD, IRGANOX 1076DWJ, IRGANOX 1098, IRGANOX 1135, IRGANOX 1330, IRGANOX 245, IRGANOX 245FF, IRGANOX 259, and IRGANOX 3114 (manufactured by BASF SE), ANTAGE BHT, ANTAGE W-300, and ANTAGE CRYSTAL (manufactured by Kawaguchi Chemical Industry Co., LTD.), ADK STAB AO-20, ADK STAB AO-30, ADK STAB AO-40, ADK STAB AO-50, ADK STAB AO-50F, ADK STAB AO-60, ADK STAB AO-60G, ADK STAB AO-80, and ADK STAB AO-330 (manufactured by ADEKA CORPORATION), SEENOX BCS and SEENOX 326M (manufactured by SHIPRO KASEI KAISI-A, LTD.), BHT SWANOX (manufactured by Seiko Chemical Co., Ltd.), NOCRAC 200, NOCRAC NS-30, NOCRAC 300, and NOCRAC PBK (manufactured by OUCHI SHINKO CHEMICAL INDUSTRIAL CO., LTD.), and the like are able to be used.

Specific examples of the phenol-based compound which is preferable as the additive are able to include compounds described below.

(B-1)

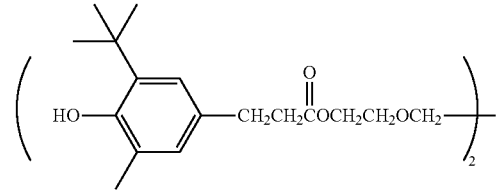

IRGANOX245

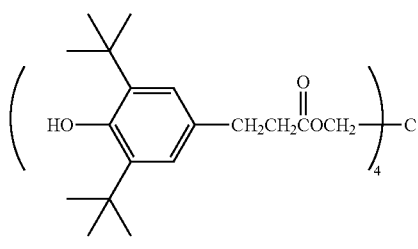

IRGANOX1010

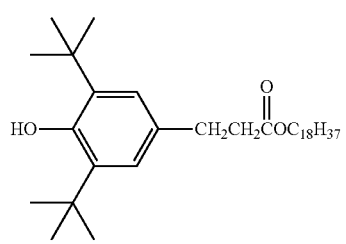

IRGANOX1076

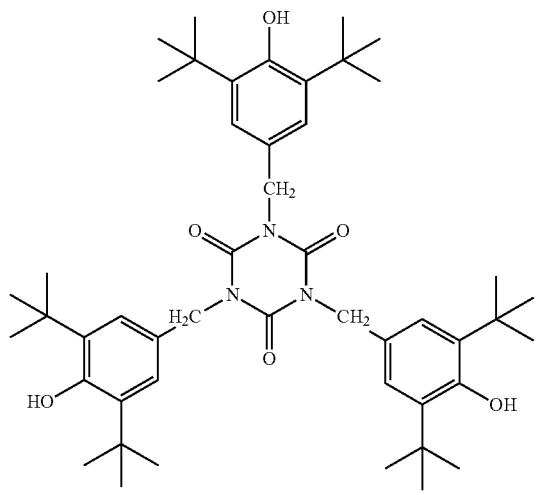

IRGANOX

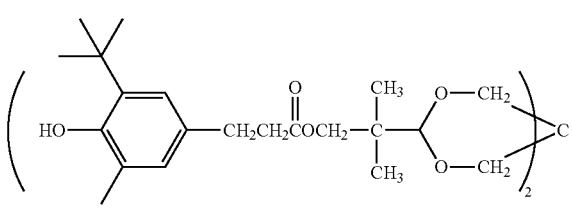

SUMILIZER GA-80

(Styrene-Based Copolymer)

For example, a styrene-based copolymer including a structure unit denoted by General Formula (2) described below, and a structure unit denoted by General Formula (3) or (4) described below is also able to be used as the additive.

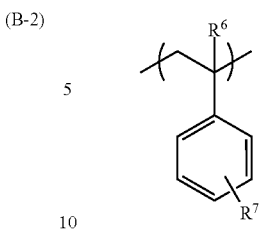

General Formula (2)

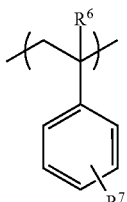

General Formula (3)

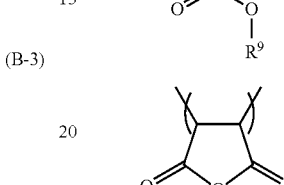

General Formula (4)

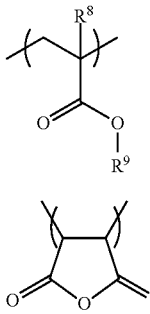

[In General Formula (2), $R^6$ represents a hydrogen atom or an alkyl group having 1 to 4 carbon atoms, and $R^7$ represents a hydrogen atom, a halogen atom, an alkyl group having 1 to 4 carbon atoms, an alkoxy group having 1 to 4 carbon atoms, or an alkyl carbonyl oxy group having 1 to 4 carbon atoms. In General Formula (3), $R^8$ represents a hydrogen atom or a methyl group, and $R^9$ represents a hydrogen atom or an alkyl group having 1 to 20 carbon atoms.]

$R^6$ represents a hydrogen atom or an alkyl group having 1 to 4 carbon atoms, is preferably the hydrogen atom or a methyl group, and is more preferably the hydrogen atom.

$R^7$ represents a hydrogen atom, a halogen atom, an alkyl group having 1 to 4 carbon atoms, an alkoxy group having 1 to 4 carbon atoms, or an alkyl carbonyl oxy group having 1 to 4 carbon atoms, and is preferably the hydrogen atom.

$R^8$ represents a hydrogen atom or a methyl group, and is preferably the methyl group.

$R^9$ represents a hydrogen atom or an alkyl group having 1 to 20 carbon atoms, and is preferably the methyl group.

The ratio of the structure unit denoted by General Formula (2) in the styrene-based copolymer is preferably 50 mass % to 100 mass %, is more preferably 60 mass % to 100 mass %, and is even more preferably 70 mass % to 100 mass %.

The ratio of the structure unit denoted by General Formula (3) or (4) in the styrene-based copolymer is preferably 0 mass % to 50 mass %, is more preferably 0 mass % to 40 mass %, and is even more preferably 0 mass % to 30 mass %.

The styrene-based copolymer which is used in the present invention is able to be manufactured by using a commercially available monomer. Examples of a monomer including the styrene-based unit denoted by General Formula (2) include styrene, α-methyl styrene, p-methyl styrene, p-t-butyl styrene, p-chlorostyrene, p-methoxy styrene, p-acetoxy styrene, and the like, and the styrene is preferable. Examples of a monomer including the (meth)acrylic unit denoted by General Formula (3) include methacrylates such as methyl methacrylate, ethyl methacrylate, propyl methacrylate, and n-butyl methacrylate, and acrylates such as methyl acrylate, ethyl acrylate, propyl acrylate, and n-butyl acrylate, and the methyl methacrylate is preferable. A monomer including the dicarboxylic acid anhydride unit denoted by General Formula (4) is maleic anhydride.

Solution polymerization, bulk polymerization, emulsion polymerization, suspension polymerization, and the like are able to be suitably adopted as a manufacturing method of the styrene-based copolymer which is used in the present invention.

In addition, a commercially available product may be applied as the styrene-based copolymer which is used in the present invention, and for example, ESTYRENE MS-200, ESTYRENE MS-300, ESTYRENE MS-500, and ESTYRENE MS-600 (manufactured by NIPPON STEEL & SUMIKIN CHEMICAL CO., LTD.), DENKA TX polymers TX-100S and TX-800LF (manufactured by Denka Company Limited), CEVIAN MAS10 and CEVIAN MAS30 (manufactured by Daicel Polymer Ltd.), SMA 1000, SMA 2000, SMA 3000, SMA EF30, SMA EF40, SMA EF60, and SMA EF80 (Cray Valley USA, manufactured by limited liability company), and the like are able to be used.

Specific examples of the styrene-based compound which is preferable as the additive are able to include a compound formed of a structure unit described below.

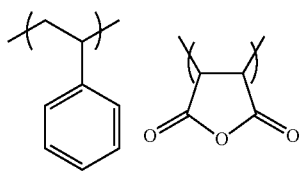

(Novolak Resin)

A novolak resin including a structure unit denoted by General Formula (5) described below is also able to be used as the additive.

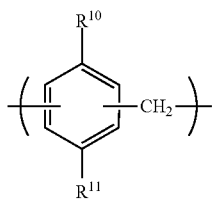

General Formula (5)

[In General Formula (5), $R^{10}$ represents a hydroxyl group or an alkoxy group having 1 to 12 carbon atoms, and $R^{11}$ represents a hydrogen atom or an alkyl group having 1 to 8 carbon atoms.]

$R^{10}$ represents a hydroxyl group or an alkoxy group having 1 to 12 carbon atoms, and is preferably an alkoxy group having 1 to 2 carbon atoms.

$R^{11}$ represents a hydrogen atom or an alkyl group having 1 to 8 carbon atoms, and is preferably the hydrogen atom.

The novolak resin which is used in the present invention is able to be manufactured by using a commercially available raw material, and is obtained by performing polycondensation with respect to commercially available phenols and formaldehyde in the presence of an acid catalyst using a known method. Phenol, o-cresol, m-cresol, p-cresol, p-t-butyl phenol, p-nonyl phenol, p-octyl phenol, p-t-octyl phenol, and the like, and a mixture thereof are able to be used as the phenols described above. In addition, formalin, paraform, acetal, and the like, and a mixture thereof are able to be used as the formaldehyde raw material described above. In addition, an oxalic acid, a sulfuric acid, a p-toluene sulfonic acid, and the like are able to be used as the acid catalyst described above.

In addition, a novolak resin in which a phenolic hydroxyl group is modified may be used as the novolak resin which is used in the present invention. A modification method is not limited insofar as a phenolic hydroxyl group is able to be acylated and alkylated.

A commercially available product may be used as the novolak resin which is used in the present invention, and for example, SUMILITE RESIN PR SERIES (manufactured by Sumitomo Bakelite Co., Ltd.), SHONOL BRG SERIES and CRG SERIES (manufactured by SHOWA DENKO K. K.), RESITOP PSM SERIES (manufactured by Gunei Chemical Industry Co., Ltd.), AV LITE RESIN PAPS SERIES (manufactured by ASAHI ORGANIC CHEMICALS INDUSTRY CO., LTD.), PHENOLITE TD SERIES, KA SERIES (manufactured by DIC Corporation), alkyl phenol resin TAMANOL SERIES (manufactured by Arakawa Chemical Industries, Ltd.), and the like are able to be used.

Specific examples of the novolak resin which is preferable as the additive are able to include compound including a structure unit described below.

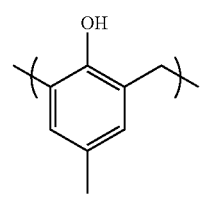

(C-1)

Cresol Novolak

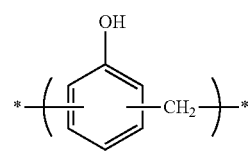

(C-2)

PR—HF-3

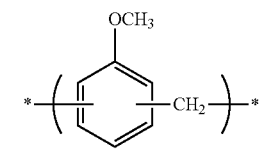

(C-3)

Methyl-Modified Phenol Novolak

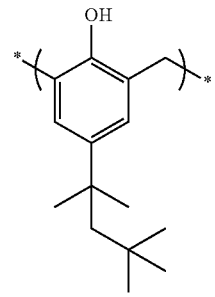

(C-4)

TAMANOL 510

(Other Additives)

A compound described below is also able to be preferably used as the additive in addition to the phenol-based compound, the styrene-based compound, and the novolak resin described above.

Examples of other additives are able to include a plasticizer, an ultraviolet absorbent, an antioxidant, a brittleness improver, an optical expression agent, and the like.

The plasticizer has a function of improving fluidity or flexibility of a dope composition. Examples of the plasticizer include a phthalic acid ester-based plasticizer, a fatty acid ester-based plasticizer, a trimellitic acid ester-based plasticizer, a phosphoric acid ester-based plasticizer, a polyester-based plasticizer, an epoxy-based plasticizer, or the like.

Examples of the ultraviolet absorbent include a benzotriazole-based ultraviolet absorbent, a 2-hydroxy benzophenone-based ultraviolet absorbent, a salicylic acid phenyl ester-based ultraviolet absorbent, or the like. For example, triazoles such as 2-(5-methyl-2-hydroxy phenyl) benzotriazole, 2-[2-hydroxy-3,5-bis(α,α-dimethyl benzyl) phenyl]-2H-benzotriazole, and 2-(3,5-di-t-butyl-2-hydroxy phenyl) benzotriazole, and benzophenones such as 2-hydroxy-4-methoxy benzophenone, 2-hydroxy-4-octoxy benzophenone, and 2,2'-dihydroxy-4-methoxy benzophenone are able to be exemplified.

Further, in order to improve thermal decomposition properties or thermal coloration properties at the time of molding processing, various antioxidants, brittleness improvers, optical expression agents, and the like are also able to be added to the dope composition of the present invention as the additive.

One type of the additives described above may be independently used, or two or more types thereof may be used in combination.

(Weight Average Molecular Weight of Additive)

A measurement method of the weight average molecular weight of the additive can be referred to the description with respect to the measurement method of the weight average molecular weight of the acrylic resin. The weight average molecular weight of the additive is less than 50,000, is preferably 500 to 50,000, is more preferably 500 to 30,000, and is even more preferably 500 to 20,000.

By setting the weight average molecular weight of the additive of the present invention to be less than 50,000, it is possible to obtain an effect of accelerating the drying of the casting film according to an increase in a relative drying temperature (a drying temperature at a relative value with respect to the glass transition temperature) due to a decrease in the glass transition temperature even in a case where a value of De/Dn described below is less than 1.

In addition, by setting the weight average molecular weight of the additive to be less than 50,000, it is possible to obtain compatibility between the acrylic resin and the additive, and it is possible to avoid an increase in a haze value due to addition of the additive.

(Content of Additive)

It is preferable that the content of the additive in the dope composition of the present invention is greater than or equal to 5 parts by mass with respect to 100 parts by mass of the acrylic resin described above. It is more preferable that the content of the additive is greater than or equal to 7 parts by mass. In a case where the content of the additive is less than 5 parts by mass, the drying speed may not be sufficiently accelerated according to the type of additive. In addition, the content of the additive in the dope composition is preferably less than or equal to 50 parts by mass, is more preferably less than or equal to 40 parts by mass, and is even more preferably less than or equal to 30 parts by mass, with respect to 100 parts by mass of the acrylic resin. By suppressing the content of the additive to be less than or equal to 50 parts by mass, it is possible to sufficiently increase the viscosity of a solution in the dope composition, and it is possible to obtain a film having an excellent surface shape by a solution film formation method.

[Concentration of Solid Contents in Dope Composition]

The concentration of solid contents in the dope composition is preferably greater than or equal to 10 mass %, and is preferably less than or equal to 30 mass %. Accordingly, it is possible to obtain a polymer film having high quality in which unevenness in the film thickness is suppressed. In addition, the concentration of the solid contents in the dope composition is preferably less than or equal to 25 mass %, and is more preferably less than or equal to 22 mass %. Accordingly, it is possible to reliably obtain an effect of easily peeling off the film due to alcohol described below.

[Solvent]

The solvent of the dope composition may include a solvent in which the acrylic resin, the additive, and as necessary, other additives are dissolved, but is not particularly limited thereto. In the present invention, either a chlorine-based solvent containing a chlorine-based organic solvent as a main solvent or a non-chlorine-based solvent not containing a chlorine-based organic solvent is able to be used as an organic solvent. Two or more types of the organic solvents may be used by being mixed.

When the dope composition is prepared, the chlorine-based organic solvent is preferably used as a main solvent. In the present invention, the type of chlorine-based organic solvent is not particularly limited insofar as the object of the present invention is able to be obtained in a range where the acrylic resin and the additive contained in the dope composition are able to be dissolved and cast, and a film is able to be formed. Dichloromethane and chloroform are preferable as the chlorine-based organic solvent. The dichloromethane is particularly preferable. In addition, there is no particular problem even in a case where organic solvents other than the chlorine-based organic solvent are mixed. In this case, it is necessary that the use amount of dichloromethane is at least 50 mass % with respect to the total amount of the organic solvent. In the present invention, the other organic solvent which is used along with the chlorine-based organic solvent will be described below. That is, a solvent selected from ester, ketone, ether, alcohol, hydrocarbon, and the like which have 3 to 12 carbon atoms is preferable as a preferred other organic solvent. The ester, the ketone, the ether, and the alcohol may have a cyclic structure. A compound having two or more of any one functional group (that is, —O—, —CO—, and —COO—) of the ester, the ketone, and the ether is also able to be used as the solvent, and for example, other functional groups such as an alcoholic hydroxyl group may be simultaneously included. In a case of a solvent having two or more types of functional groups, the number of carbon atoms may be in a specified range of a compound having any one functional group.

Examples of esters having 3 to 12 carbon atoms include ethyl formate, propyl formate, pentyl formate, methyl acetate, ethyl acetate, pentyl acetate, and the like. Examples of ketones having 3 to 12 carbon atoms include acetone, methyl ethyl ketone, diethyl ketone, diisobutyl ketone, cyclopentanone, cyclohexanone, methyl cyclohexanone, and the like. Examples of ethers having 3 to 12 carbon atoms include diisopropyl ether, dimethoxy methane, dimethoxy ethane, 1,4-dioxane, 1,3-dioxolane, tetrahydrofuran, anisole, phenetole, and the like. Examples of the organic solvent having two or more types of functional groups include 2-ethoxy ethyl acetate, 2-methoxy ethanol, 2-butoxy ethanol, and the like.

In addition, the alcohol which is used along with the chlorine-based organic solvent may be straight-chain alcohol, branched alcohol, or cyclic alcohol, and among them, a saturated aliphatic hydrocarbon is preferable. The hydroxyl group of the alcohol may be any one of a primary hydroxyl group to a tertiary hydroxyl group. Examples of the alcohol include methanol, ethanol, 1-propanol, 2-propanol, 1-butanol, 2-butanol, t-butanol, 1-pentanol, 2-methyl-2-butanol, and cyclohexanol. Furthermore, fluorine-based alcohol is also used as the alcohol. Examples of the fluorine-based alcohol include 2-fluoroethanol, 2,2,2-trifluoroethanol, 2,2,3,3-tetrafluoro-1-propanol, and the like. Further, the hydrocarbon may be straight-chain hydrocarbon, branched hydrocarbon, or cyclic hydrocarbon. Either aromatic hydrocarbon or aliphatic hydrocarbon is able to be used. The aliphatic hydrocarbon may be saturated aliphatic hydrocarbon or unsaturated aliphatic hydrocarbon. Examples of the hydrocarbon include cyclohexane, hexane, benzene, toluene, and xylene.

For example, a solvent disclosed in JP2007-140497A is able to be used as the other solvent.

It is preferable that the dope composition of the present invention contains a mixed solvent of (A) methylene chloride and (B) alcohol having 1 to 4 carbon atoms as the solvent, and a mass ratio (A:B) of (A) the methylene chloride and (B) the alcohol having 1 to 4 carbon atoms is 85:15 to 50:50. Furthermore, in the following description, the methylene chloride may be referred to as a solvent (A), and the alcohol having 1 to 4 carbon atoms may be referred to as a solvent (B).

According to such a solvent composition, in the dope composition, it is possible to easily peel off the polymer film which is obtained by drying the casting film from a support.

(Alcohol Having 1 to 4 Carbon Atoms)

Methanol, ethanol, and isopropanol are preferably used as (B) the alcohol having 1 to 4 carbon atoms which is used in the mixed solvent, the methanol and the ethanol are more preferably used, and only the methanol is even more preferably used.

(Mixed Ratio A:B)

A mixed ratio (A:B) of (A) the methylene chloride and (B) the alcohol having 1 to 4 carbon atoms in the solvent indicates that the mixed ratio of (A) the methylene chloride and (B) the alcohol having 1 to 4 carbon atoms is A:B=85:15 to 50:50. The ratio of A:B is preferably 85:15 to 60:40, is more preferably 85:15 to 70:30, and is even more preferably 85:15 to 75:25. By setting the mixed ratio (A:B) to be in such a range, it is possible to reliably obtain the effect of easily peeling off the film as described above.

[Properties of Dope Composition]

(Drying Speed of Dope Composition)

A drying speed of the dope composition in the present invention is measured in the following procedure.

(1) A dope composition is prepared such that the concentration of an acrylic resin becomes 16 mass %, and the dope composition is cast onto a metal support such that the thickness becomes 56 μm.

(2) A polymer film formed of the dope composition is peeled off from the metal support at a time point where the amount of residual solvent in the dope composition becomes 20 mass %.

(3) Four sides of the peeled polymer film are fixed in a metal frame, and drying is performed in SELCO at 140° C.

(4) The polymer film is left to stand for 5 minutes, and then, the polymer film is taken out from the SELCO, and a part of the polymer film is collected as a sample.

(5) The collected sample is dissolved in a chloroform solution, and the amount of solvent which remains in the sample quantified by gas chromatography.

After that, sampling is performed every 5 minutes by repeating (4) and (5), a calibration curve is obtained, and thus, a time at which the amount of residual solvent becomes less than or equal to 0.1 mass % is confirmed.

A drying time of the dope composition is preferably is shorter than 40 minutes, is more preferably is shorter than or equal to 30 minutes, and is even more preferably is shorter than or equal to 25 minutes, from the viewpoint of increasing manufacturing efficiency of the polymer film. The dope composition of the present invention has an operation in which an additive having a weight average molecular weight of less than 50,000 accelerates the drying of the casting film, and thus, it is possible to reliably suppress the drying time to be shorter than 40 minutes.

(Breaking Elongation of Un-Stretched Film)

Herein, "breaking elongation" of an un-stretched film is breaking elongation measured on the basis of a method defined in JIS-K7127-1999.

In the un-stretched film formed by using the dope composition of the present invention, breaking elongation at the time of being un-stretched in at least one direction is preferably greater than or equal to 5%, and is more preferably greater than or equal to 10%. By setting the breaking elongation of the un-stretched film to be greater than or equal to 5%, breakage at the time of performing molding or processing rarely occurs. The upper limit of the breaking elongation of the un-stretched film is not particularly limited, but is practically and approximately 250%. In the un-stretched film which is formed by using the dope composition of the present invention, the acrylic resin having a high molecular weight is contained in the dope composition of the present invention, and thus, it is possible to reliably obtain breaking elongation of greater than or equal to 5%. In order to increase the breaking elongation, it is effective to suppress a defect in the film due to foreign substances or foaming.

<Polymer Film Formed by Performing Film Formation with Respect to Dope Composition>

The polymer film which is obtained by performing film formation with respect to the dope composition of the present invention has a homogeneous surface shape, and is able to be efficiently manufactured, and thus, is useful for various applications. In addition, the polymer film has an excellent surface shape and a low haze value, and thus, is able to be suitably used as an optical film such as a polarizing plate protective film or an optical compensation film.

Hereinafter, a polarizing plate protective film (a polarizing plate protective film of the present invention) and an optical compensation film will be described as suitable application of the polymer film which is obtained by performing film formation with respect to the dope composition of the present invention.

[Polarizing Plate Protective Film]

The polarizing plate protective film of the present invention includes at least one polymer film which is obtained by performing film formation with respect to the dope composition of the present invention, and may have a configuration including only one polymer film which is obtained by performing film formation with respect to the dope composition of the present invention or a configuration including two or more polymer films which are obtained by performing film formation with respect to the dope composition of the present invention, and the configuration including only one polymer film is preferable.

In addition, the polarizing plate protective film of the present invention may have a multi-layer configuration including layers other than the polymer film which is obtained by performing film formation with respect to the dope composition of the present invention. In a case of the multi-layer configuration including two or more polymer films which are obtained by performing film formation with respect to the dope composition of the present invention, each of the polymer films may be obtained by performing film formation with respect to the same dope composition, or may be obtained by performing film formation with respect to different dope compositions. In addition, in the polarizing plate protective film, the surface of the polymer film which is obtained by performing film formation with respect to the dope composition of the present invention may be subjected to a surface treatment described below, or a functional layer described below may be disposed on the surface of the polymer film. It is preferable that the polarizing plate protective film of the present invention has a configuration including the polymer film which is obtained by performing film formation with respect to the dope composition of the present invention as at least one outermost layer (a layer including an air boundary surface).

The configuration of the dope composition can be referred to the description in the section of <Dope Composition> described above. In addition, a film formation method of the dope composition will be described in the section of <Manufacturing Method of Polarizing Plate Protective Film> described below.

Here, properties of the polarizing plate protective film of the present invention will be described in detail.

(Moisture Permeability in Terms of Polarizing Plate Protective Film of 40 μm)

Herein, the "moisture permeability in terms of the polarizing plate protective film of 40 μm" is a standard value by converting the moisture permeability of the film which is measured in conditions of a temperature of 40° C. and relative humidity of 90% into the film thickness of 40 μm on the basis of a method defined in JIS Z-0208. In samples having different film thicknesses, it is necessary that the conversion is performed by setting the reference to be 40 μm.

Here, in the polarizing plate protective film of the present invention, the film thickness of the polymer film which is obtained by performing film formation with respect to the dope composition of the present invention is preferably 10 μm to 60 μm, is more preferably 10 μm to 50 μm, and is even more preferably 20 μm to 50 μm.

The conversion of the film thickness is performed according to the following numerical expression.

Moisture Permeability in terms of 40 μm=Actually Measured Moisture Permeability×Actually Measured Film Thickness (μm)/40 (μm). Numerical Expression:

The moisture permeability of the polarizing plate protective film of the present invention in terms of 40 μm is preferably less than or equal to 70 g/m²/day, is more preferably less than or equal to 65 g/m²/day, and is even more preferably 60 g/m²/day, since warping of a liquid crystal cell or display unevenness at the time of black display is able to be suppressed after being aged under an environment of normal temperature, high humidity, and high temperature and high humidity in a liquid crystal display device to which the polarizing plate protective film is applied.

(Haze Value of Polarizing Plate Protective Film)

Herein, the "haze value" of the polarizing plate protective film is the total haze value and an inside haze value which are measured with respect to a film sample of 40 mm×80 mm cut out from the polarizing plate protective film in conditions of a temperature of 25° C. and relative humidity of 60% on the basis of a method defined in JIS K-6714. The haze value is able to be measured by using a hazemeter (manufactured by Suga Test Instruments Co., Ltd., Product Name: HGM-2DP).

In the polarizing plate protective film of the present invention, it is preferable that the total haze value is less than or equal to 2.00%. In a case where the total haze value is less than or equal to 2.00%, it is effective that transparency of the film is high, and a contrast ratio or brightness of a liquid crystal display device is improved. The total haze value is more preferably less than or equal to 1.00%, is even more preferably less than or equal to 0.50%, is particularly preferably less than or equal to 0.30%, and is most preferably less than or equal to 0.20%. Optical performance is excellent as the total haze value decreases, and in consideration of selection of a raw material, manufacturing management, or handling properties of a roll film, it is preferable that the total haze value is greater than or equal to 0.01%.

It is preferable that the inside haze value of the polarizing plate protective film of the present invention is less than or equal to 1.00%. By setting the inside haze value to be less than or equal to 1.00%, it is possible to improve the contrast ratio of the liquid crystal display device, and it is possible to realize excellent display properties. The inside haze value is more preferably less than or equal to 0.50%, is even more preferably less than or equal to 0.20%, is particularly preferably less than or equal to 0.10%, and is most preferably less than or equal to 0.05%. It is preferable that the inside haze value is greater than or equal to 0.01% from the viewpoint of the selection of the raw material, the manufacturing management, or the like.

In the polarizing plate protective film of the present invention, it is particularly preferable that the total haze value is less than or equal to 0.30% and the inside haze value is less than or equal to 0.10%.

In the polarizing plate protective film of the present invention, by setting the weight average molecular weight of the acrylic resin in the dope composition of the present invention to be greater than or equal to 250,000, the acrylic resin and an additive having a weight average molecular weight of less than 50,000 are highly compatible with each other. For this reason, it is possible to reliably realize a low haze value as described above.

The total haze value and the inside haze value are able to be adjusted according to the type or the added amount of the acrylic resin or the additive in the dope composition, the selection of the additive (in particular, the weight average molecular weight and the added amount), or film manufacturing conditions (a temperature, a stretching ratio, or the like at the time of being stretched).

(Equilibrium Moisture Content of Polarizing Plate Protective Film)

Herein, the "equilibrium moisture content" of the polarizing plate protective film is a value which is calculated by dividing a moisture content (g) which is measured with respect to a film sample of 7 mm×35 mm cut out from the polarizing plate protective film in conditions of a temperature of 25° C. and relative humidity of 80% according to a KARL FISCHER method with a sample mass (g). The equilibrium moisture content is able to be measured by using a moisture measuring instrument (manufactured by Mitsubishi Chemical Corporation, Product Name: CA-03) and a sample drying device (manufactured by Mitsubishi Chemical Corporation, Product Name: VA-05).

When the polarizing plate protective film of the present invention is used as a protective film of a polarizing plate, in order to not impairing adhesiveness with respect to a water-soluble thermoplastic material such as polyvinyl alcohol, it is preferable that the equilibrium moisture content at a temperature of 25° C. and relative humidity of 80% is 0 mass % to 4 mass % regardless of the film thickness. The equilibrium moisture content is more preferably 0.1 mass % to 2.5 mass %, and is even more preferably 0.5 mass % to 1.5 mass %. In a case where the equilibrium moisture content is less than or equal to 4 mass %, dependency of retardation according to a change in a temperature does not excessively increase, and the display unevenness at the time of black display is able to be suppressed after being aged under an environment of normal temperature, high humidity, and high temperature and high humidity in the liquid crystal display device to which the polarizing plate protective film is applied.

(Diffusion Coefficient of Polarizing Plate Protective Film)

In the polarizing plate protective film of the present invention, it is preferable that diffusion coefficients De and Dn defined by Expression (1) described below satisfy the conditions of Expression (2) described below.

$$De=Pe/Se, Dn=Pn/Sn \qquad \text{Expression (1)}$$

$$De/Dn>1 \qquad \text{Expression (2)}$$

[In Expressions (1) and (2), Pe represents the moisture permeability of the polarizing plate protective film, Se represents the equilibrium moisture content of the polarizing plate protective film at a temperature of 25° C. and a relative humidity of 80%, Pn represents the moisture permeability of an additive-free film which has the same configuration as that of the polarizing plate protective film except that the additive is not contained, and Se represents the equilibrium moisture content of the additive-free film at a temperature of 25° C. and relative humidity of 80%. Here, the moisture permeability is a value obtained by converting a value after being aged at a temperature of 40° C. and relative humidity of 90% for 24 hours into the film thickness of 40 μm using a method of JIS Z-0208.]

The moisture permeability of the polymer film is represented by a moisture permeability coefficient P, and the moisture permeability coefficient is a coefficient which is determined as a product of a diffusion coefficient D of water vapor in the film and a solubility coefficient S in a case where a HENRY's law is established in dissolution of the water vapor with respect to the film surface.

That is, $P=D \times S$ is established.

Here, a measurement method of the "moisture permeability" can be referred to the description in the section of (Moisture Permeability of Polarizing Plate Protective Film in terms of 40 μm) described above, and a measurement method of the "moisture content" can be referred to the description in the section of (Equilibrium Moisture Content of Polarizing Plate Protective Film).

(Surface Shape of Polarizing Plate Protective Film)

In the polarizing plate protective film of the present invention, it is preferable that the maximum height difference in the film thickness (a P-V value) is small.

The maximum height difference in the film thickness (the P-V value) of the film is able to be measured by using a known method, and for example, is able to be measured by using a fringe device, a laser displacement gauge, a contact type film thickness meter, and the like.

Examples of the fringe device include a FUJINON fringe device (FX-03). In addition, examples of a method other than the method using the fringe device described above include a method in which the film thickness in a range having a diameter of 60 mm is measured by using a laser displacement gauge, a contact type film thickness meter, and the like on the basis of an arbitrary point in the film, and the maximum height difference in the film thickness is able to be obtained.

Among them, herein, the "maximum height difference in the film thickness (the P-V value)" of the polarizing plate protective film indicates the maximum height difference in the film thickness measured in a measurement area having a diameter of 60 mm by using the fringe device FX-03 (manufactured by FUJINON Corporation).

In the polarizing plate protective film of the present invention, the maximum height difference in the film thickness (the P-V value) is preferably less than or equal to 3.0 μm, is more preferably less than or equal to 1.1 μm, and is particularly preferably less than or equal to 0.9 μm. The polarizing plate protective film of the present invention is configured of the polymer film which is obtained by performing film formation with respect to the dope composition of the present invention, and thus, it is possible to reliably suppress the maximum height difference in the film thickness (the P-V value) to be less than or equal to 3.0 μm.

[Polarizing Plate Protective Film Manufacturing Method]

Next, a polarizing plate protective film manufacturing method of the present invention will be described.

The polarizing plate protective film manufacturing method of the present invention is a method of manufacturing the polarizing plate protective film by the solution film formation method, and includes at least a dissolving step of dissolving a material such as an acrylic resin in a solvent and preparing the dope composition of the present invention, a casting step of casting the dope composition of described above onto a support and forming a casting film, and a peeling step of drying the casting film described above, and then, peeling off the casting film from the support described above, and thus, obtaining a polymer film.

As necessary, a drying step of further drying the peeled polymer film, and thus, removing a residual solvent (a volatile content) may be further performed after the peeling step.

As necessary, a stretching step of stretching the polymer film at least in a monoaxial direction, and as necessary, in a biaxial direction may be performed after the peeling step.

Hereinafter, each of the steps will be described.

These steps, for example, are able to be continuously performed by a film manufacturing line illustrated in FIG. 1. Here, a film manufacturing line which is used in a manufacturing method of the present invention is not limited to the film manufacturing line illustrated in FIG. 1. Furthermore, in the film manufacturing line, an "infiltrated film", a "dried film" obtained by drying the infiltrated film, and a "stretched film" obtained by stretching the dried film are obtained in the middle of the line, the casting film of the present invention includes all films (the "infiltrated film", the "dried film", and the "stretched film") from the casting step to the peeling step, and the polymer film of the present invention includes all films (the "infiltrated film", the "dried film", and the "stretched film") which is peeled off from the support after the peeling step.

A film manufacturing line 20 illustrated in FIG. 1 includes a stock tank 21, a filtration device 30, a casting die 31, a metal support 34 stretched between rotating rollers 32 and 33, a tenter type drier 35, and the like. Further, a selvage cutting device 40, a drying chamber 41, a cooling chamber 42, a winding chamber 43, and the like are arranged.

A stirrer 61 which is rotated by a motor 60 is attached to the stock tank 21. Then, the stock tank 21 is connected to the casting die 31 through a pump 62 and the filtration device 30.

It is preferable that the width of the casting die 31 is 1.1 times to 2.0 times the width of a film which becomes a final product.

The metal support 34 stretched between the rotating rollers 32 and 33 is disposed in the lower portion of the casting die 31. The rotating rollers 32 and 33 are rotated by a driving device (not illustrated), and the metal support 34 endlessly travels according to the rotation.

In order to set the surface temperature of the metal support 34 to a predetermined value, it is preferable that a heat-transmitting medium circulation device 63 is attached to the rotating rollers 32 and 33. It is preferable that the surface temperature of the metal support 34 is able to be adjusted to be −20° C. to 40° C.

It is preferable to use the metal support 34 of which the width is in a range of 1.1 times to 2.0 times the casting width of a dope composition 22. In addition, it is preferable that the metal support 34 is ground such that a length is 20 m to 200 m, a film thickness is 0.5 mm to 2.5 mm, and surface roughness is less than or equal to 0.05 μm. It is preferable that the metal support 34 is formed of stainless steel, and it is more preferable that the metal support 34 is formed of SUS316 in order to have sufficient corrosion resistance and strength. In addition, the metal support 34 in which film thickness unevenness of the entire metal support 34 is less than or equal to 0.5% is preferably used.

Furthermore, the rotating rollers 32 and 33 are able to be directly used as the support.

The casting die 31, the metal support 34, and the like are contained in a casting chamber 64. Temperature adjustment equipment 65 for retaining the internal temperature of the casting chamber 64 at a predetermined value, and a condenser 66 for performing condensation collecting with respect to an organic solvent which is volatilized are disposed in the casting chamber 64. Then, a collecting device 67 for collecting the organic solvent which has been subjected to condensation and liquefaction is disposed on the outside of the casting chamber 64. In addition, it is preferable that a decompression chamber 68 for performing pressure control with respect to a back surface portion of a casting bead which is formed from the casting die 31 to the metal support 34 is disposed, and in this embodiment, the decompression chamber 68 is used.

Blowing ports 70, 71, and 72 for evaporating the solvent in a casting film 69 are disposed in the vicinity of the circumferential surface of the metal support 34.

A crossover portion 80 includes a blowing machine 81, a crusher 90 for finely cutting the excess of a side end portion of a cut film 82 (referred to as a selvage) is connected to the selvage cutting device 40 on downstream of the tenter type drier 35.

The drying chamber 41 includes a plurality of rollers 91, and an adsorption collecting device 92 for performing adsorption collecting with respect to solvent gas generated by being evaporated is attached to the drying chamber 41. A forced static elimination device (a static elimination bar) 93 for adjusting the charging voltage of the film 82 to be in a predetermined range (for example, −3 kV to +3 kV) is disposed on the downstream of the cooling chamber 42. Further, in this embodiment, a knurling applying roller 94 for applying knurling to both edges of the film 82 in embossing processing is suitably disposed on the downstream of the forced static elimination device 93. In addition, a winding roller 95 for winding the film 82, and a press roller 96 for controlling a tension at the time of winding the film are included in the winding chamber 43.

Next, an example of a method of manufacturing the film 82 by using the film manufacturing line 20 (a band manufacturing device) as described above will be described below.

The dope composition 22 consistently becomes even by rotating the stirrer 61. An additive such as a retardation expression agent, a plasticizer, and an ultraviolet absorbent is able to be mixed into the dope composition 22 even at the time of being stirred.

(1) Dissolving Step

The dissolving step is a step of preparing the dope composition of the present invention. It is preferable that the dissolving step of the present invention includes a step of dissolving a polymer and an additive in an organic solvent mainly containing a good solvent with respect to the polymer in a dissolving vessel while stirring the polymer and the additive, and forming a dope, or a step of mixing an additive solution with a polymer solution and forming a dope composition.

The material of the dope composition can be referred to the description in the section of <Dope Composition> described above.

It is preferable that the dope composition is prepared at a temperature of higher than or equal to 0° C. (a normal temperature or a high temperature). The dope composition of the present invention is able to be prepared by using a preparation method and a preparation device of a dope in a general solvent casting method.

The polymer is able to be dissolved by using various dissolving method such as a method of dissolving the polymer at atmospheric pressure, a method of dissolving the polymer at a temperature lower than or equal to a boiling point of a main solvent, a method of dissolving the polymer at a temperature of higher than or equal to the boiling point of the main solvent under pressurization, a method using a cooling dissolving method as disclosed in JP1997-95544A (JP-H09-95544A), JP1997-95557A (JP-H09-95557A), or JP1997-95538A (JP-H09-95538A), and a method of dissolving the polymer at high pressure as disclosed in JP1999-21379A (JP-H11-21379A). The method of dissolving the polymer at a temperature of higher than or equal to the boiling point of the main solvent under pressurization is particularly preferable from the viewpoint of dissolving efficiency. In this case, the acrylic resin, the solvent (A), and the solvent (B) are put into a pressurized vessel, the pressurized vessel is sealed, and the acrylic resin, the solvent (A), and the solvent (B) are stirred while being heated to a temperature which is higher than or equal to the boiling point of the solvent at normal temperature under pressure and is in a range where the solvent is not boiled.

The temperature in a case of heating is generally higher than or equal to 40° C., is preferably 60° C. to 200° C., and is more preferably 80° C. to 110° C.

It is preferable that the concentration of the acrylic resin in the dope composition is 10 mass % to 40 mass %. It is preferable that the additive is added to the dope composition while being dissolved or after being dissolved, and is dissolved and dispersed, and then, is filtered by a filter material, is defoamed, and is fed to the next step by a liquid feeding pump.

(2) Casting Step

The casting step is a step of casting the dope composition described above onto the metal support and forming the casting film. It is preferable that the casting step is a step of feeding the dope to a pressurizing die through a liquid feeding pump (for example, a pressurizing quantitative gear pump), and casting the dope composition in a casting position on the metal support of an endless metal belt performing infinite feeding, for example, a stainless steel belt, a rotating metal drum, or the like, from a pressurizing die slit. The dope composition 22 is fed to the filtration device 30 by the pump (for example, pressurizing quantitative gear pump) 62, and is filtered through the filtration device 30, and is cast onto the metal support 34 from the casting die 31.

The casting bead is formed from the casting die 31 to the metal support 34, and the casting film 69 is formed on the metal support 34. It is preferable that the temperature of the dope composition 22 at the time of being cast is −10° C. to 57° C.

The casting film 69 moves according to the movement of the metal support 34. The pressurizing die in which a slit shape of a base portion of the die is able to be adjusted, and a film thickness easily becomes even is preferable as the die. Examples of the pressurizing die include a coat hanger die, a T die, and the like, and any of them is preferably used. The surface of the metal support is a mirror surface. In order to increase a film formation speed, two or more pressurizing dies may be disposed on the metal support, and the dope composition may be layered by being divided. Alternatively, it is preferable that a film having a laminated structure is obtained by a cocasting method of simultaneously casting a plurality of dope compositions.

(3) Solvent Evaporating Step

Next, the casting film 69 is continuously transported to a portion in which a blowing port 73 is arranged on the upper portion. Dry air is blown towards the casting film 69 from a nozzle of the blowing port 73. It is preferable that a solvent evaporating step is included between the casting step and the peeling step. The solvent evaporating step is a step of heating the casting film (also referred to as a web which indicates a state before being a finished product of the polymer film, in which a large amount of solvent is still contained) on the metal support, and evaporating the solvent until the web is able to be peeled off from the metal support.

In order to evaporate the solvent, a method of blowing air to the solvent from the web side and/or a method of heat-transmitting the solvent from the rear surface of the metal support by a liquid, a method of heat-transmitting the solvent from the front and rear surfaces by radiation heat, and the like are used, and the rear surface liquid heat-transmission method is preferable from the viewpoint of excellent drying efficiency. In addition, a method in which the methods described above are combined is also preferable. In a case of using the rear surface liquid heat-transmission, it is preferable that heating is performed at a temperature of lower than or equal to a boiling point of a main solvent of an organic solvent or an organic solvent having the lowest boiling point which is used in the dope composition.

(4) Peeling Step

The peeling step is a step of drying the casting film described above, and then, peeling off the casting film from the support described above, and obtaining the polymer film. In the casting film 69, the solvent is evaporated by being dried, and thus, the polymer film has self-supporting properties, and then, is peeled off from the metal support 34 while being supported by a peeling roller 75 as a polymer film 74 (a wet film). It is preferable that the peeling step is a step of peeling off the web from which the solvent is evaporated in a peeling position on the metal support. The peeled web is fed to the next step. Furthermore, in a case where the amount of residual solvent of the web at a time point of being peeled off (the following expression) excessively increases, the web is hardly peeled off, and in contrast, in a case where the web is peeled off after being sufficiently dried on the metal support, a part of the web is peeled off in the middle.

It is preferable that the peeling is performed in a range the amount of residual solvent of the web on the metal support at the time of being peeled off is 5 mass % to 150 mass % according to the strength and weakness of drying conditions, the length of the metal support, or the like, and in a case of performing the peeling at a time point where the amount of residual solvent is large, the amount of residual solvent at the time of peeling off the web is determined according to a balance between an economic speed and quality. In the present invention, a temperature in the peeling position on the metal support is preferably −50° C. to 40° C., is more preferably 10° C. to 40° C., and is most preferably 15° C. to 30° C.

In addition, the amount of residual solvent of the web in the peeling position is preferably 10 mass % to 150 mass %, and is more is preferably 10 mass % to 120 mass %.

Here, the amount of residual solvent is able to be denoted by the following expression.

$$\text{Amount of Residual Solvent (mass \%)} = [(M-N)/N] \times 100$$

Here, M represents the mass of the web at an arbitrary time point, and N represents the mass of the web having a mass M at the time of being dried at 110° C. for 3 hours.

After that, the crossover portion 80 in which a plurality of rollers are disposed is transported, and the polymer film 74 which is peeled off in the conditions as described above is transported to the tenter type drier 35. In the crossover portion 80, the polymer film 74 is dried by blowing dry air having a desired temperature from the blowing machine 81. At this time, it is preferable that the temperature of the dry air is 20° C. to 250° C.

It is preferable that the polymer film 74 is stretched in a width direction (a TD direction) which is orthogonal to a transport direction (an MD direction). By stretching the polymer film 74 in the width direction, it is possible to reduce unevenness which occurs at the time of being dried or being peeled off on the obtain support and to obtain an excellent surface shape in the plane of the film. A stretching ratio in the width direction is preferably greater than or equal to 10%, is more preferably greater than or equal to 20%, and is even more preferably greater than or equal to 30%.

(5) Drying or Heat Treatment Step and Stretching Step

After the peeling step described above, it is preferable that the web is dried by using a drying device in which the web is alternately transported through a plurality of rollers arranged in the drying device, and/or a tenter device in which the web is transported by clipping both ends of the web with a clip.

The polymer film 74 which is fed to the tenter type drier 35 is dried while being transported by gripping both end portions of the polymer film 74 with a clip. At this time, the stretching in the width direction is able to be performed by using the tenter type drier 35.

Furthermore, the inside of the tenter type drier 35 is sectionally divided into a temperature zone, and drying conditions are able to be suitably adjusted for each section.

Thus, it is possible to stretch the polymer film 74 in the width direction by the crossover portion 80 and/or the tenter type drier 35.

The stretching may be performed in the transport direction, and the rotating speed of a roller on the downstream side of the crossover portion 80 is faster than the rotating speed of a roller on the upstream side of the crossover portion 80, and thus, it is possible to apply a draw tension to the polymer film 74 in the transport direction.

Here, in the crossover portion 80 and/or tenter type drier 35, the stretching may be performed by drying the polymer film 74 in a state of being un-stretched, and by setting the amount of residual solvent in the film to be less than or equal to 3.0 mass %, preferably less than or equal to 1.0 mass %, more preferably less than or equal to 0.5 mass %, even more preferably less than or equal to 0.3 mass %, and particularly preferably less than or equal to 0.2 mass %.

Furthermore, in a case of stretching the polymer film in which the amount of residual solvent is less than or equal to 3.0 mass %, the stretching may be performed after winding the polymer film once in a state of being un-stretched.

Blowing hot air to both surfaces of the web is general as means for performing drying and a heat treatment, and means for heating the web by being brought into contact with microwave instead of air is also used. A temperature, an air volume, and a time are different according to the solvent to be used, and conditions may be suitably selected according to the type of solvent to be used, and a combination thereof.

The polymer film to be stretched may be a dried film or a wet film, and the wet film is more preferable.

A stretching treatment may be performed in any one direction of MD and TD, or biaxial stretching may be performed in both directions. The stretching in each direction of MD and TD may be performed in one stage, or may be performed in multiple stages. In a case of performing the biaxial stretching, it is preferable that the stretching treatment is performed in the order of MD and TD.

First, stretching in a film transport direction MD will be described.

The stretching ratio of the stretching in the film transport direction MD is preferably 30% to 80%, and is particularly preferably 40% to 60%. The stretching ratio (elongation) of the web at the time of being stretched is able to be attained according to a difference in a circumferential speed between a metal support speed and peeling speed (peeling roll draw). For example, in a case of using a device including two nip rolls, the rotating speed of a nip roll on an inlet side is set to be faster than the rotating speed of a nip roller on an outlet side, and thus, it is possible to preferably stretch the film in the transport direction (a vertical direction).

Furthermore, herein, the "stretching ratio (%)" indicates a value obtained by the following expression.

Stretching Ratio (%)=100×{(Length after Being Stretched)−(Length before Being Stretched)}/Length before Being Stretched At this time, it is preferable that a surface temperature T1 of the film is in the following range in order to stretching the film without being broken.

$T1 \leq 100°\ C. -3.2\ A1$

Here, A1 represents the amount of residual solvent of the web at the time of performing the stretching in MD, is preferably 10 mass % to 30 mass %, and is more preferably 10 mass % to 20 mass %.

On the other hand, in order to increase the number of times of folding endurance of the film, it is preferable that the surface temperature T1 of the film is in the following range.

$T1 \leq 170°\ C. -2.8\ A1$

Next, stretching in the direction TD which is orthogonal to the film transport direction will be described.

The stretching ratio of the stretching in the direction TD which is orthogonal to the film transport direction is preferably 30% to 80%, and is particularly preferably 40% to 60%.

Furthermore, in the present invention, it is preferable that stretching is performed by using a tenter device as a method of performing the stretching in the direction TD which is orthogonal to the film transport direction.

At this time, it is preferable that a surface temperature T2 of the film is in the following range in order to stretching the film without being broken.

$T2 \leq 100°\ C. -3.2\ A2$

Here, A2 represents the amount of residual solvent of the web at the time of performing the stretching in TD, is preferably 0 mass % to 10 mass %, and is more preferably 0 mass % to 5 mass %. On the other hand, in order to increase the number of times of folding endurance of the film, it is preferable that the surface temperature T2 of the film is in the following range.

$T2 \leq 170°\ C. -2.8\ A2$

Furthermore, the web may be dried after the stretching step. In a case where the web is dried after the stretching step, a drying temperature, a dry air volume, and a drying time are different according to the solvent to be used, and conditions may be suitably selected according to the type of solvent to be used, and a combination thereof.

Thus, the stretching treatment may be performed in the drying step through the crossover portion 80 and the tenter type drier 35 after forming the polymer film 74, or may be performed after drying the polymer film 74 and winding the dried polymer film. In a case where the film is prepared without being stretched, casting conditions of the present invention are preferably conditions where the film thickness is 10 μm to 200 μm, are more preferably conditions where the film thickness is 10 μm to 150 μm, are even more preferably conditions where the film thickness is 10 μm to 100 μm, and are most preferably conditions where the film thickness is 10 μm to 60 μm.

The polymer film 74 is dried by the tenter type drier 35 until a predetermined amount of residual solvent (volatile content) is obtained, and then, is fed to the downstream side as the film 82. Both edges in both side end portions of the film 82 are cut by the selvage cutting device 40. The cut side end portion is fed to the crusher 90 by a cutter blower (not illustrated). The side end portion of the film is pulverized by the crusher 90, and becomes a chip. The chip is reused for preparing the dope composition, and thus, this method is effective from the viewpoint of cost. Furthermore, a cutting step of both side end portions of the film is able to be omitted, and it is preferable that the cutting step is performed in any one step from the casting step described above to the step of winding the film described above.

The film 82 of which both side end portions are cut and removed is transported to the drying chamber 41, and is dried. It is preferable that the temperature in the drying chamber 41 is in a range of 50° C. to 160° C. In the drying chamber 41, the film 82 is transported while being wound around a roller 91, and here, the solvent gas generated by being evaporated is adsorbed and collected by the adsorption collecting device 92. Air from which the solvent component is removed is blown again into the drying chamber 41 as the dry air. Furthermore, in order to change a drying temperature, it is more preferable that the drying chamber 41 is divided into a plurality of sections.

The film 82 is cooled to approximately room temperature by the cooling chamber 42. Furthermore, a humidity control chamber (not illustrated) may be disposed between the drying chamber 41 and the cooling chamber 42. In a case where the humidity control chamber is disposed, it is preferable that air which is adjusted to have desired humidity and temperature is blown with respect to the film 82. Accordingly, the occurrence of curling in the film 82 or the occurrence of winding failure at the time of being wound is able to be suppressed.

Further, it is preferable that knurling is applied onto at least one end of the film 82 in embossing processing by disposing the knurling applying roller 94. The width of the knurling is preferably 3 mm to 50 mm, and is more preferably 5 mm to 30 mm, and the height of the knurling is preferably 0.5 μm to 500 μm, and is more preferably 1 μm to 200 μm. The knurling may be applied onto only one surface, or may be applied onto both surfaces.

(6) Winding

Finally, the film 82 is wound around the winding roller 95 in the winding chamber 43. At this time, it is preferable that the film 82 is wound while applying a desired tension to the film 82 by the press roller 96. Furthermore, it is more preferable that the tension is gradually changed from the start of the winding to the end of the winding. The wound length of the film obtained as described above is preferably 100 m to 10,000 m, is more preferably 500 m to 7,000 m, and is even more preferably 1,000 m to 6,000 m, per one roll. The width of the film is preferably 0.5 m to 5.0 m, is more preferably 1.0 m to 3.0 m, and is even more preferably 1.0 m to 2.5 m. When the film is wound, it is preferable that the knurling is applied onto at least one end, and the width of the knurling is preferably 3 mm to 50 mm, and is more preferably 5 mm to 30 mm, and the height of the knurling is preferably 0.5 μm to 500 μm, and is more preferably 1 μm to 200 μm. The knurling may be one side pressing, or may be both sides pressing.

The web obtained as described above is wound, and thus, it is possible to obtain the polarizing plate protective film of the present invention.

In the solution film formation method of the present invention, when the dope composition is cast, two or more types of dope compositions are able to be subjected to simultaneously laminating cocasting or sequentially laminating cocasting. Further, both cocastings may be combined. At the time of performing the simultaneously laminating cocasting, a casting die to which a feed block is attached may be used, or a manifold type casting die may be used. It is possible to obtain a film formed of a plurality of layers by the cocasting. In this multi-layer film, it is preferable that at least any one of the thickness of a layer on an air surface side or the thickness of a layer on the support side is 0.5% to 30% of the film thickness of the entire film. Further, in a case where the simultaneously laminating cocasting is performed, it is preferable that a dope composition having high viscosity is wrapped by a dope composition having low viscosity at the time of casting the dope composition from the die slit to the metal support.

The structure of the casting die, the decompression chamber, the metal support, or the like, the cocasting, a peeling method, the stretching, the drying conditions of each of the steps, a handling method, the curling, a winding method after flatness correction, a solvent collecting method, and a film collecting method are specifically disclosed in paragraphs [0617] to [0889] of JP2005-104148A.

In addition, in the above description, an example of the manufacturing method of a polarizing plate protective film of the present invention has been described by using an example in which the dope composition is cast onto the band in the casting step, and even in a case where the dope composition is cast onto the drum in the casting step, a manufacturing method of an optical film of the present invention is established by the same mechanism. In this case, devices or manufacturing conditions disclosed in JP2013-82192A are preferably used.

[Optical Compensation Film]

The polymer film which is obtained by performing film formation with respect to the dope composition of the present invention is able to be used in various applications other than the polarizing plate protective film as described above. For example, the polymer film is able to be preferably used as an optical compensation film of the liquid crystal display device. Furthermore, the optical compensation film is generally used in the liquid crystal display device, indicates an optical material film for compensating retardation, and has the same meaning as that of a retardation plate, an optical compensation sheet, and the like. The optical compensation film has birefringence properties, and is used for removing coloration on a display screen of the liquid crystal display device or improving view angle properties.

The polymer film itself which is obtained by performing film formation with respect to the dope composition of the present invention may be the optical compensation film, or the polymer film may be used as a support of the optical compensation film, and an optical anisotropic layer may be disposed on the polymer film. The optical anisotropic layer is not limited to the optical performance or the driving mode of the liquid crystal cell of the liquid crystal display device in which the optical film of the present invention is used, and any optical anisotropic layer which is required as the optical compensation film is also able to be used together. The optical anisotropic layer to be used together may be formed of a composition containing a liquid crystal compound, or may be formed of a thermoplastic film having birefringence.

[Configuration Added to Polymer Film]

The polymer film which is obtained by performing film formation with respect to the dope composition of the present invention may have an additional configuration according to the application thereof. Examples of such a configuration are able to include a surface treatment which is performed with respect to the surface of the polymer film, a functional layer which is disposed on the surface of the polymer film, and the like. Hereinafter, the surface treatment and the functional layer will be described.

(Surface Treatment)

In the polymer film which is obtained by performing film formation with respect to the dope composition of the present invention, a surface treatment is performed according to a case, and thus, improvement in adhesiveness between the polymer film and other layers (for example, a polarizer, an undercoat layer, and a back layer) is able to be attained. For example, a glow discharge treatment, an ultraviolet ray irradiation treatment, a corona treatment, a flame treatment, and an acid or alkali treatment are able to be used. Here, the glow discharge treatment may be low temperature plasma treatment which is performed under low pressure gas of $10^{-3}$ Torr to 20 Torr, and a plasma treatment which is performed under atmospheric pressure is more preferable. Plasma excitable gas indicates gas which is subjected to plasma excitation in the conditions as described above, and examples of the plasma excitable gas include chlorofluorocarbons such as argon, helium, neon, krypton, xenon, nitrogen, carbon dioxide, and tetrafluoromethane and a mixture thereof, and the like. The details thereof are specifically disclosed in pages 30 to 32 of Journal of Technical Disclosure of Japan Institute for Promoting Invention and Innovation (Technical Disclosure No. 2001-1745, published on Mar. 15, 2001 by Japan Institute for Promoting Invention and Innovation), and are preferably used in the present invention.

(Functional Layer)

In addition, in the polarizing plate protective film of the present invention, a functional layer having a film thickness of 0.1 µm to 20 µm may be laminated on at least one surface of the polymer film described above. The type of functional layer is not particularly limited, and examples of the type of functional layer include a hardcoat layer, an antireflection layer (a layer of adjusting a refractive index such as a layer of low refractive index, a layer of intermediate refractive index, and a layer of high refractive index), an antiglare layer, an antistatic layer, an ultraviolet ray absorption layer, a moisture permeability reducing layer, and the like.

The disposed functional layer described above may be one layer, or may be a plurality of layers. A lamination method of the functional layer is not particularly limited, and it is preferable that the functional layer is disposed by being cocast with the dope composition of the present invention for forming the polymer film described above or by being applied onto the polymer film described above which is formed by using the dope composition of the present invention.

In a case where the functional layer is formed by coating and drying, it is preferable that a monomer having an ethylenically unsaturated group is used as a binder. The monomer may be monofunctional or multifunctional. Among them, it is preferable that a polymerizable multifunctional monomer is used, it is more preferable that a photopolymerizable multifunctional monomer is used, and it is particularly preferable that a coating liquid containing a monomer having two or more (meth)acryloyl groups is used.

Specific examples of the monomer having two or more (meth)acryloyl groups are able to include (meth)acrylic acid diesters of alkylene glycol such as neopentyl glycol acrylate, 1,6-hexanediol (meth)acrylate, and propylene glycol di(meth)acrylate; (meth)acrylic acid diesters of polyoxy alkylene glycol such as triethylene glycol di(meth)acrylate, dipropylene glycol di(meth)acrylate, polyethylene glycol di(meth)acrylate, and polypropylene glycol di(meth)acrylate; (meth)acrylic acid diesters of polyhydric alcohol such as pentaerythritol di(meth)acrylate; (meth)acrylic acid diesters of an ethylene oxide adduct or a propylene oxide adduct such as 2,2-bis{4-(acryloxy.diethoxy) phenyl} propane and 2-2-bis{4-(acryloxy.polypropoxy) phenyl} propane; and the like.

Further, epoxy (meth)acrylates, urethane (meth)acrylates, and polyester (meth)acrylates are also preferably used as the photopolymerizable multifunctional monomer.

Among them, esters of polyhydric alcohol and a (meth) acrylic acid are preferable. The polyhydric alcohol indicates dihydric or more alcohol.

A multifunctional monomer having three or more (meth) acryloyl groups in one molecule is more preferable. Examples of the multifunctional monomer having three or more (meth)acryloyl groups in one molecule include pentaerythritol tetra(meth)acrylate, pentaerythritol tri(meth) acrylate, trimethylol propane tri(meth)acrylate, ethylene oxide-modified trimethylol propane tri(meth)acrylate, propylene oxide-modified trimethylol propane tri(meth)acrylate, ethylene oxide-modified phosphoric acid tri(meth)acrylate, trimethylol ethane tri(meth)acrylate, ditrimethylol propane tetra(meth)acrylate, dipentaerythritol tetra(meth) acrylate, dipentaerythritol penta(meth)acrylate, dipentaerythritol hexa(meth)acrylate, 1,2,3-cyclohexane tetramethacrylate, polyurethane polyacrylate, polyester polyacrylate, caprolactone-modified tris(acryloxy ethyl)isocyanurate, and the like.

Further, examples of a resin having three or more (meth) acryloyl groups include an oligomer, a prepolymer, or the like of a polyester resin, a polyether resin, an acrylic resin, an epoxy resin, an urethane resin, an alkyd resin, a spiroacetal resin, a polybutadiene resin, and a polythiol polyene resin which have a comparatively low molecular weight, and a multifunctional compound such as polyhydric alcohol.

For example, a dendrimer disclosed in JP2005-76005A and JP2005-36105A is able to be used as the other multifunctional monomer described above.

In addition, esters of polyhydric alcohol and a (meth) acrylic acid, and amides of polyhydric alcohol and isocyanate having a plurality of (meth)acryloyl groups are also preferably used as the multifunctional monomer.

As the polyhydric alcohol, aliphatic alcohol is preferable, and among them, alcohol having a cyclic aliphatic hydrocarbon group is more preferable. A cycloalkyl group having 3 to 8 carbon atoms is preferable as an aliphatic group of monocyclic alicyclic alcohol, and examples of the cycloalkyl group having 3 to 8 carbon atoms are able to include a cyclopentyl group, a cyclohexyl group, a cyclobutyl group, a cyclooctyl group, and the like.

Examples of an aliphatic group of polycyclic alicyclic alcohol are able to include a group having a bicyclo structure, a tricyclo structure, a tetracyclo structure, and the like which have carbon atoms of greater than or equal to 5, a cycloalkyl group having 6 to 20 carbon atoms is preferable, and examples of the cycloalkyl group having 6 to 20 carbon atoms are able to include an adamantyl group, a norbornyl group, a dicyclopentyl group, a tricyclodecanyl group, a tetracyclododecyl group, a center skeleton of a compound disclosed in claims of JP2006-215096A, a center skeleton of a compound disclosed in JP2001-10999A, and the like. Furthermore, a part of the carbon atoms in the cycloalkyl group may be substituted with a hetero atom such as an oxygen atom.

Among them, polyhydric alcohols having the adamantyl group, the norbornyl group, the dicyclopentyl group, the tricyclodecanyl group, the tetracyclododecyl group, the center skeleton of the compound disclosed in claims of JP2006-215096A, and the center skeleton of the compound disclosed in JP2001-10999A are particularly preferable as polycyclic alcohol, from the viewpoint of decreasing moisture permeability.

Two or more types of polymerizable multifunctional monomers may be used in combination. The monomer having such an ethylenically unsaturated group is able to be polymerized by performing irradiation of ionizing radiation or heating in the presence of a photoradical initiator or a thermal radical initiator.

It is preferable that the photopolymerization initiator is used in a polymerization reaction of the photopolymerizable multifunctional monomer. A photoradical polymerization initiator and a photocationic polymerization initiator are preferable as the photopolymerization initiator, and the photoradical polymerization initiator is particularly preferable.

In addition, it is preferable that the polymerizable multifunctional monomer described above and a monofunctional monomer are used in combination.

A monomer having one (meth)acryloyl group is preferable as the monofunctional monomer, and in general, the monomer having one (meth)acryloyl group is able to be obtained from monohydric alcohol and an acrylic acid.

The monohydric alcohol described above may be aromatic alcohol, or may be aliphatic alcohol.

Examples of the monohydric alcohol include methyl alcohol, n-propyl alcohol, iso-propyl alcohol, n-butyl alcohol, tert-butyl alcohol, n-amyl alcohol, diacetone alcohol, 1-methoxy-2-propanol, furfuryl alcohol, 2-octanol, 2-ethyl hexanol, nonanol, n-decanol, undecanol, n-dodecanol, trimethyl nonyl alcohol, benzyl alcohol, phenethyl alcohol, ethylene glycol monoisoamyl ether, ethylene glycol monophenyl ether, ethylene glycol monobenzyl ether, and ethylene glycol monohexyl ether.

In addition, an aliphatic portion of the aliphatic alcohol may be a cyclic aliphatic portion. The cyclic aliphatic portion may be a monocyclic aliphatic portion, or may be a polycyclic aliphatic portion, and in a case of the polycyclic aliphatic portion, the aliphatic portion may be a bridged aliphatic portion. A cycloalkyl group having 3 to 8 carbon atoms is preferable as the monocyclic aliphatic portion, and examples of the cycloalkyl group having 3 to 8 carbon atoms are able to include a cyclopentyl group, a cyclohexyl group, a cyclobutyl group, a cyclooctyl group, and the like. Examples of the polycyclic aliphatic portion are able to include a group having a bicyclo structure, a tricyclo structure, a tetracyclo structure, and the like which have carbon atoms of greater than or equal to 5, a cycloalkyl group having 6 to 20 carbon atoms is preferable, and examples of the cycloalkyl group having 6 to 20 carbon atoms are able to include an adamantyl group, a norbornyl group, a dicyclopentyl group, a tricyclodecanyl group, a tetracyclododecyl group, a center skeleton of a compound disclosed in claims of JP2006-215096A, a center skeleton of a compound disclosed in JP2001-10999A, and the like. Furthermore, a part of the carbon atoms in the cycloalkyl group may be substituted with a hetero atom such as an oxygen atom.

The monohydric alcohol may be aromatic alcohol, or may be aliphatic alcohol, and monohydric alcohol having carbon atoms of greater than or equal to 6 is preferable.

An acrylic acid and a methacrylic acid are preferable as the (meth)acrylic acid.

In addition, in order to use the antireflection layer (the layer of adjusting a refractive index such as the layer of low refractive index, the layer of intermediate refractive index, and the layer of high refractive index), the antiglare layer, the antistatic layer, the ultraviolet ray absorption layer, and the moisture permeability reducing layer as the functional layer, various adducts may be added.

The thickness of the functional layer described above is preferably 0.01 µm to 100 µm, and is particularly preferably 0.02 µm to 50 µm. Further, a functional layer having a thickness of 0.1 µm to 20 µm is more particularly preferable as the functional layer of reducing moisture permeability.

In a case where a functional layer of reducing the moisture permeability is used as the functional layer, C/D of moisture permeability (C) of an optical film in which the functional layer is laminated to moisture permeability (D) of an optical film in which the functional layer is not laminated is preferably less than or equal to 0.9. C/D is more preferably less than or equal to 0.85, and is even more preferably less than or equal to 0.8.

<<Polarizing Plate>>

Next, a polarizing plate of the present invention will be described.

The polarizing plate of the present invention includes the polarizing plate protective film of the present invention. The configuration of the polarizing plate protective film of the present invention can be referred to that in the description in the section of [Polarizing Plate Protective Film] described above.

The polarizing plate is able to be prepared by a general method. Examples of a manufacturing method of the polarizing plate include a method in which the polarizing plate protective film of the present invention is subjected to an alkali treatment, and is bonded to both surfaces of a polarizer which is prepared by dipping and stretching a polyvinyl alcohol film in an iodine solution by using an aqueous solution of completely saponified polyvinyl alcohol. Easily adhesive processing as disclosed in JP1994-94915A (JP-H06-94915A) and JP1994-118232A (JP-H06-118232A) may be performed instead of the alkali treatment. In addition, the surface treatment as described above may be performed.

Example of an adhesive agent which is used for bonding the treatment surface of the polarizing plate protective film to the polarizer include a polyvinyl alcohol-based adhesive agent such as polyvinyl alcohol and polyvinyl butyral, a vinyl-based latex such as butyl acrylate, and the like.

The polarizing plate protective film and the polarizer may be bonded by other adhesive agents or pressure sensitive adhesive agents, or may be directly laminated without using the adhesive agent or the pressure sensitive adhesive agent.

<Liquid Crystal Display Device>

A liquid crystal display device of the present invention includes the polarizing plate of the present invention, it is preferable that the liquid crystal display device includes a liquid crystal cell, and the polarizing plate of the present invention which is arrange on at least one side of the liquid crystal cell, and it is more preferable that the liquid crystal display device has a configuration in which the polarizing plate protective film of the present invention included in the polarizing plate described above is arranged to be an outermost layer.

EXAMPLES

Hereinafter, the present invention will be specifically described on the basis of examples. Materials, reagents, substance quantities and ratios thereof, operations, and the like described in the following examples are able to be suitably changed insofar as the change is not departed from the gist of the present invention. Accordingly, the scope of the present invention is not limited to the following examples.

<Preparation of Material>
(Acrylic Resin)
An acrylic resin described below was used.

Manufacturing Example 1

An acrylic resin having a weight average molecular weight of 1,300,000 and an MMA ratio of 100% were synthesized by the following method.

300 g of ion exchange water and 0.6 g of polyvinyl alcohol (a degree of saponification of 80% and a degree of polymerization of 1,700) were added to a three-neck flask of 1 L to which a mechanical stirrer, a thermometer, and a cooling pipe were attached and were stirred, the polyvinyl alcohol was completely dissolved, and then, 100 g of methyl methacrylate and 0.15 g of benzoyl peroxide were added and reacted with each other at 85° C. for 6 hours. The obtained suspension liquid was filtered through nylon filter cloth and was washed with water, a filtrate was dried all night at 50° C., and thus, an aimed polymer was obtained in the shape of a bead (92.0 g).

A commercially available DIANAL BR85 (manufactured by Mitsubishi Rayon Co., Ltd.) was used as an acrylic resin having a weight average molecular weight of 400,000 which was used in Example 15.

A commercially available DELPET 80N (manufactured by Asahi Kasei Chemicals Corporation) was used as an acrylic resin having a weight average molecular weight of 50,000 which was used in Comparative Example 3.

An acrylic resin having a weight average molecular weight of 1,300,000 and an MMA ratio of 97% which was used in Example 16 was synthesized by the same method as that in Manufacturing Example 1 except that 97 g of methyl methacrylate and 3 g of methyl acrylate were used instead of 100 g of methyl methacrylate.

An acrylic resin having a weight average molecular weight of 1,300,000 and an MMA ratio of 95% which was used in Comparative Example 4 was synthesized by the same method as that in Manufacturing Example 1 except that 97 g of methyl methacrylate and 3 g of methyl acrylate 3 g were used instead of 100 g of methyl methacrylate.

(Additive)
Compounds A-1 to A-4 having the following structure units St and MAn at a ratio shown in Table 1, and compounds B-1 to B-5 and C-1 to C-4 described below were used as an additive.

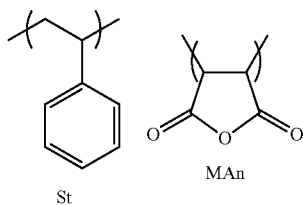

TABLE 1

|     | St  | MAn | Mw     |
|-----|-----|-----|--------|
| A-1 | 50  | 50  | 5500   |
| A-2 | 75  | 25  | 9500   |
| A-3 | 80  | 20  | 11000  |
| A-4 | 80  | 20  | 120000 |

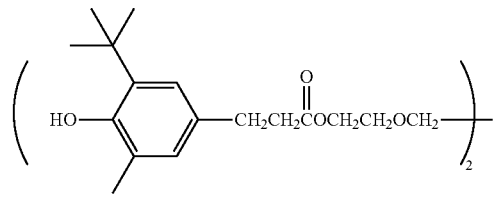

IRGANOX245

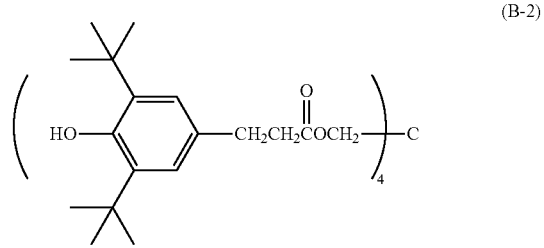

IRGANOX1010

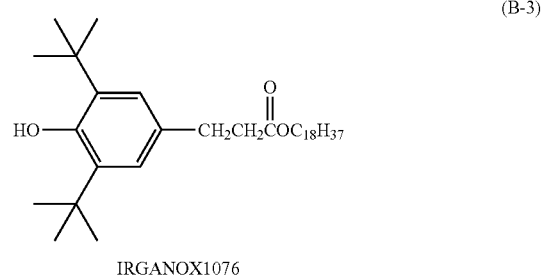

IRGANOX1076

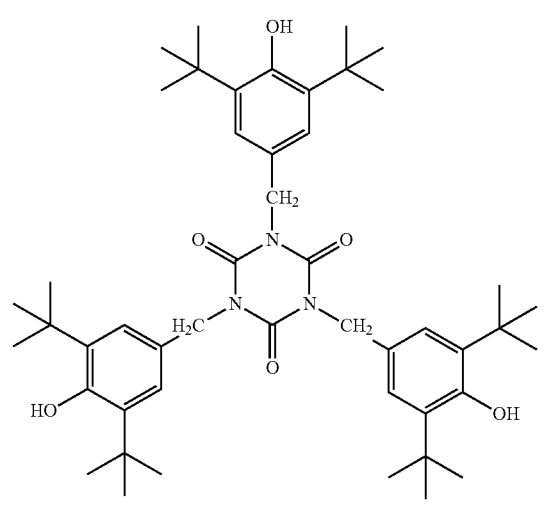

IRGANOX

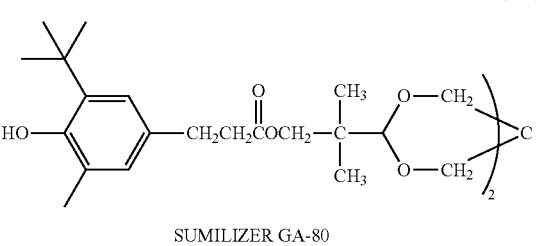

SUMILIZER GA-80

Synthesis Example 1: Cresol Novolak (C-1)

92 g of p-cresol, 23 g of paraformaldehyde, and 1 g of an oxalic acid were weighed and put into a three-neck flask of 500 mL to which a stirrer, a thermometer, and a cooling pipe were attached, and reacted to each other at 110° C. for 3 hours under nitrogen stream. Next, a non-reactant and a byproduct were distilled at 110° C. and 0 torr for 1 hour under reduced pressure. The reaction product was moved to an SUS vessel, and was further dried at 140° C. and 0 torr for 4 hours under reduced pressure, and thus, aimed cresol novolak (C-1) was obtained as a colorless and transparent amorphous material (96.0 g).

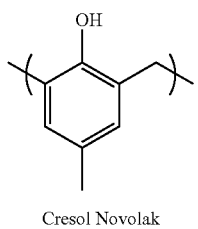

Cresol Novolak (C-1)

Synthesis Example 2: Methyl-Modified Phenol Novolak (C-3)

30 g of phenol novolak PR-HF-3 (manufactured by Sumitomo Bakelite Co., Ltd.) and 300 mL of dimethyl acetamide were weighed and put into a three-neck flask of 1 L to which a mechanical stirrer, a thermometer, a cooling pipe, and a dropping funnel were attached, and were stirred at room temperature. After confirming that the compositions described above were dissolved, 78 g of potassium carbonate and 60 g of iodomethane were added thereto, and reacted to each other at 120° C. for 3 hours. After performing cooling, dilution was performed by using 1 L of ethyl acetate, the obtained organic layer was sequentially washed with water, a hydrochloric acid of 1 mol/L, saturated sodium bicarbonate water, and salt water, and was dried by using magnesium sulfate. The organic layer was concentrated by a evaporator, and then, was purified by a silica gel column (hexane/ethyl acetate=1/2), and thus, an aimed methyl-modified phenol novolak (C-3) was obtained as a colorless and transparent amorphous material (28.8 g).

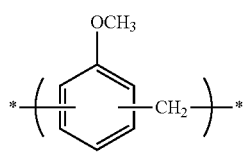

Methyl-Modified Phenol Novolak (C-3)

Phenol novolak PR-HF-3 (manufactured by Sumitomo Bakelite Co., Ltd.) was used as a novolak resin C-2, and TAMANOL 510 (manufactured by Arakawa Chemical Industries, Ltd.) was used as a novolak resin C-4.

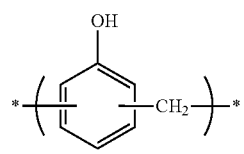

PR—HF-3 (C-2)

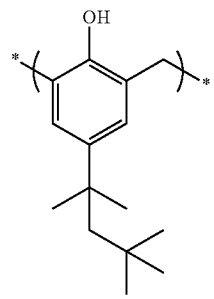

TAMANOL 510 (C-4)

[Property Evaluation of Material Used in Dope Composition]

(Measurement Conditions of Weight Average Molecular Weight)

The weight average molecular weight of the acrylic resin and the additive was measured by gel permeation chromatography. Measurement conditions were as follows.
Solvent Tetrahydrofuran
Device Name TOSOH HLC-8220GPC
Column Three TOSOH TSKgel Super HZM-H (4.6 mm×15 cm) Were Used by Being Connected.
Column Temperature 25° C.
Sample Concentration 0.1 mass %
Flow Rate 0.35 ml/min
Calibration Curve TSK Standard Polystyrene manufactured by Tosoh Corporation, Calibration curves of Seven Samples of Mw=2,800,000 to 1050 Were Used.

(Glass Transition Temperature)

The glass transition temperature of the acrylic resin and the additive was obtained as an average value of a temperature at which a base line derived from the glass transition of the acrylic resin and the additive started to be changed and a temperature at which the change returned to the base line again at the time of being measured at a temperature rising rate of 10° C./minute by using differential scanning calorimetery (DSC).

Example 1

Preparation of Polymer Film (Dissolving Step: Preparation of Dope Composition)
The following compositions were put into a mixing tank and were stirred while being heated, each component was dissolved, and thus, a dope composition was prepared.
(Composition of Dope Composition)
PMMA Resin 100 parts by mass
Additive A-1 10 parts by mass
Dichloromethane 534 parts by mass
Methanol 46 parts by mass
[Evaluation of Film Formation Step]
(Drying Time)
A polymer film was formed by using the dope composition which was used in each of the examples and the comparative examples according to the procedure disclosed in the section of [Drying Speed of Dope Composition] herein, and the obtained polymer film was sampled at 6 cm square. Herein, a time at which the amount of residual solvent became less than or equal to 0.1 parts by mass was estimated according to the procedure disclosed in the section of [Drying Speed of Dope Composition]. The average value obtained by performing the measurement two times was set to a drying time, and a drying speed was evaluated.

(Breaking Elongation of Un-Stretched Film)

The dope composition which was used in each of the examples and the comparative examples was solution cast, measurement was performed in an atmosphere of a temperature of 25° C. and relative humidity of 60% at a tensile speed of 10%/minute by using a general-purpose tensile tester "STM T50BP" manufactured by Toyo Baldwin Co, Ltd., and the elongation of the film at the time of being broken was measured.

A: The breaking elongation is less than 5%.
B: The breaking elongation is 5% to 10%
C: The breaking elongation is greater than 10%.

<Film Formation of Polarizing Plate Protective Film>
(Casting Step)

The prepared dope composition was homogeneously cast onto a stainless steel endless band (a casting support) having a width of 2,000 mm from a casting die by using the film manufacturing line as illustrated in FIG. 1, and thus, a casting film was formed.

(Peeling Step)

The casting film was peeled off from the casting support as a polymer film at a time point where the amount of residual solvent in the dope composition became 20 mass %.

The casting film was transported by a tenter without being actively stretched, and was dried in a drying zone at 140° C.

A polymer film having a thickness of 56 µm was prepared in the steps described above. A single-layer film of the polymer film obtained as described above was set to a polarizing plate protective film of Example 1.

[Evaluation of Polarizing Plate Protective Film]
(Haze)

The measurement of the haze was performed by measuring a film sample of 40 mm×80 mm which was cut from the polarizing plate protective film at a temperature of 25° C. and relative humidity of 60% using a hazemeter "HGM-2DP" {manufactured by Suga Test Instruments Co., Ltd.} according to JIS K-6714.

A: The haze is less than or equal to 1.0%.
C: The haze is greater than 1.0%.
Whitening: The film was whitened, and thus, the haze was not able to be measured.

(Film Surface Shape)

The maximum height difference (a P-V value) of the film thickness of the polarizing plate protective film was measured by a FUJINON fringe analysis device (FX-03). At this time, a measurement area was set to a range of a diameter of φ=60 mm. The average refractive index of 1.48 of the acrylic resin was used as the value of a refractive index to be polarizing plate protective film. In addition, the resolution of this device is 512×512.

A: The maximum height difference (the P-V value) of the film thickness is less than or equal to 1.1 µm.
B: The maximum height difference (the P-V value) of the film thickness is greater than 1.1 µm and less than or equal to 3.0 µm.
C: The maximum height difference (the P-V value) of the film thickness is greater than 3.0 µm.

(Diffusion Coefficient)

The moisture permeability and the equilibrium moisture content of the polarizing plate protective film were respectively obtained, and a diffusion coefficient was calculated by the moisture permeability/the equilibrium moisture content.

The equilibrium moisture content was measured by performing measurement with respect to a film sample of 7 mm×35 mm which was cut from the polarizing plate protective film by a KARL FISCHER Method using moisture measuring instrument and a sample drying device "CA-03" and "VA-05" {both were manufactured by Mitsubishi Chemical Corporation}. The equilibrium moisture content was calculated by dividing a moisture content (g) with a sample mass (g).

The moisture permeability of the polarizing plate protective film for deriving the diffusion coefficient was measured in conditions of a temperature of 40° C. and relative humidity of 90% based on JIS Z-0208.

A value of (Moisture Permeability)/(Equilibrium Moisture Content) was calculated on the basis of the values described above, and was set to the diffusion coefficient.

(Moisture Permeability in terms of 40 µm)

The moisture permeability of the polarizing plate protective film was measured in conditions of a temperature of 40° C. and relative humidity of 90% according to a method defined in JIS Z-0208. Then, the moisture permeability in terms of 40 µm was obtained according to Expression (A) described below by using the actually measured moisture permeability.

Moisture Permeability in terms of 40 µm=Actually Measured Moisture Permeability×Actually Measured Film Thickness (µm)/40 (µm)   Expression (A)

Examples 2 to 16 and Comparative Examples 1 to 4

In the preparation of the dope composition of Example 1, dope compositions of Examples 2 to 16 and dope compositions of Comparative Examples 1 to 4 were prepared by the same method as that in Example 1 except that the type and the amount of the acrylic resin and the additive were changed as shown in Table 2 and the concentration of the solid contents in the dope composition was changed to 16 mass %.

The drying time of the obtained dope composition of each of the examples and the comparative examples and the breaking elongation of an un-stretched film using the dope composition of each of the examples and the comparative examples were measured by the same method as that in Example 1. The obtained results were shown in Table 2 described below.

In the preparation of the polarizing plate protective of Example 1, polarizing plate protective films of Examples 2 to 16 and polarizing plate protective films of Comparative Examples 1 to 4 were prepared in the same casting film formation conditions as those of the polarizing plate protective film of Example 1 except that the used dope composition was changed to the dope composition of each of the examples and the comparative examples.

The haze, the surface shape, the ratio of the diffusion coefficient, and the moisture permeability of the obtained polarizing plate protective film of each of the examples and the comparative examples were measured by the same method as that in Example 1. The obtained results were shown in Table 2 described below.

TABLE 2

| | Dope Composition | | | | | | | |
|---|---|---|---|---|---|---|---|---|
| | Acrylic Resin | | | | | | Additive | |
| | Methyl Methacrylate Unit [wt %] | Configuration Unit of Copolymerization Component | | Molecular Weight (Mw) | Glass Transition Temperature of Acrylic Resin [° C.] | | | |
| | | Type | Added Amount [wt %] | | | Type | Molecular Weight (Mw) | Added Amount [wt %] |
| Comparative Example 1 | 100 | — | — | 1,300,000 | 122 | — | — | 0 |
| Example 1 | 100 | — | — | 1,300,000 | 122 | A-1 | 5500 | 10 |
| Example 2 | 100 | — | — | 1,300,000 | 122 | A-2 | 9500 | 10 |
| Example 3 | 100 | — | — | 1,300,000 | 122 | A-3 | 11000 | 10 |
| Comparative Example 2 | 100 | — | — | 1,300,000 | 122 | A-4 | 120000 | 10 |
| Example 4 | 100 | — | — | 1,300,000 | 122 | B-1 | 587 | 10 |
| Example 5 | 100 | — | — | 1,300,000 | 122 | B-2 | 1178 | 10 |
| Example 6 | 100 | — | — | 1,300,000 | 122 | B-3 | 531 | 10 |
| Example 7 | 100 | — | — | 1,300,000 | 122 | B-4 | 784 | 10 |
| Example 8 | 100 | — | — | 1,300,000 | 122 | B-5 | 741 | 10 |
| Example 9 | 100 | — | — | 1,300,000 | 122 | B-5 | 741 | 5 |
| Example 10 | 100 | — | — | 1,300,000 | 122 | B-5 | 741 | 30 |
| Example 11 | 100 | — | — | 1,300,000 | 122 | C-1 | 2534 | 10 |
| Example 12 | 100 | — | — | 1,300,000 | 122 | C-2 | 2000 | 10 |
| Example 13 | 100 | — | — | 1,300,000 | 122 | C-3 | 2000 | 10 |
| Example 14 | 100 | — | — | 1,300,000 | 122 | C-4 | 3000 | 10 |
| Example 15 | 100 | — | — | 400,000 | 120 | B-5 | 741 | 10 |
| Comparative Example 3 | 100 | — | — | 100,000 | 117 | B-5 | 741 | 10 |
| Example 16 | 97 | Methyl Acrylate | 3 | 1,300,000 | 115 | B-5 | 741 | 10 |
| Comparative Example 4 | 95 | Methyl Acrylate | 5 | 1,300,000 | 108 | B-5 | 741 | 10 |

| | Evaluation of Film Formation Step | | Evaluation of Polarizing Plate Protective Film | | | | |
|---|---|---|---|---|---|---|---|
| | Drying Time | Breaking | | | | | |
| | 56 μm, 140° C. [min] | Elongation of Un-Stretched Film | Haze | Surface Shape | De/Dn [—] | Moisture Permeability g/m²/day | |
| Comparative Example 1 | 40 | A | A | A | — | 70 | |
| Example 1 | 55 | A | A | A | 0.95 | 74 | |
| Example 2 | 29 | A | A | A | 1.12 | 74 | |
| Example 3 | 28 | A | A | A | 1.17 | 76 | |
| Comparative Example 2 | 29 | A | Whitening | A | 1.15 | 74 | |
| Example 4 | 30 | A | A | A | 1.05 | 62 | |
| Example 5 | 27 | A | A | A | 1.22 | 66 | |
| Example 6 | 20 | A | A | A | 1.66 | 82 | |
| Example 7 | 27 | A | A | A | 1.20 | 71 | |
| Example 8 | 30 | A | A | A | 1.03 | 56 | |
| Example 9 | 35 | A | A | A | 1.01 | 61 | |
| Example 10 | 30 | A | A | A | 1.05 | 45 | |
| Example 11 | 38 | A | A | A | 0.66 | 48 | |
| Example 12 | 38 | A | A | A | 0.54 | 45 | |
| Example 13 | 30 | A | A | A | 1.08 | 64 | |
| Example 14 | 35 | A | A | A | 0.94 | 65 | |
| Example 15 | 30 | B | A | B | 1.03 | 56 | |
| Comparative Example 3 | 30 | C | A | C | 1.03 | 56 | |
| Example 16 | 30 | A | A | A | 1.03 | 56 | |
| Comparative Example 4 | 30 | A | A | A | 1.03 | 56 | |

From Table 2 described above, it was found that the dope composition of each of the examples was excellent for manufacturing aptitude from the viewpoint of having a high drying speed, increasing the breaking elongation at a time point of forming the un-stretched film, and suppressing a crack at the time of being stretched. In addition, it was found that the haze value was low, the surface shape was excellent, and the heat resistance was excellent at the time of preparing the polarizing plate protective film.

In contrast, in the polarizing plate protective film using the dope composition of Comparative Example 1 to which the additive was not added, the drying speed was slow. In the polarizing plate protective film using the dope composition of Comparative Example 2 in which the weight average molecular weight of the additive was greater than 50,000, whitening was confirmed, the haze was extremely high, and a practical problem as the polarizing plate protective film occurred. In addition, in the polarizing plate protective film using the dope composition of Comparative Example 3 in which the weight average molecular weight of the acrylic resin was less than 250,000, the breaking elongation was small, and the surface shape also became a practical problem. Further, in the dope composition of Comparative Example 4 in which 5 mass % of methyl acrylate was contained in the acrylic resin, the glass transition temperature of the acrylic resin used in the dope composition was low, and the heat resistance of the polarizing plate protective film deteriorated.

<Preparation of Polarizing Plate>

[Preparation of Films 1 to 16 Attached with Hardcoat Layer]

(Preparation of Coating Composition HCL-1 for Forming Hardcoat Layer)

8 parts by mass of pentaerythritol triacrylate, 0.5 parts by mass of IRGACURE 127 (manufactured by BASF SE), 4 parts by mass of a bifunctional acrylic compound denoted by Formula C-3 described below were mixed, and thus, a coating material (HCL-1) for forming a hardcoat layer was prepared.

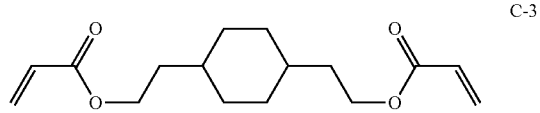 [SMILES: C=CC(=O)OCCC1CCC(CCOC(=O)C=C)CC1]

C-3

[Preparation of Hardcoat Layer]

The coating liquid (HCL-1) for forming a hardcoat layer was applied onto the polarizing plate protective films 1 to 16 prepared as described above by a die coating method and was dried at 80° C. for 5 minutes, a coating layer was cured by being irradiated with ultraviolet ray having irradiation dose of 300 mJ/cm$^2$ under nitrogen purge by using an "air-cooled metal halide lamp" (manufactured by EYE GRAPHICS CO., LTD.) of 240 W/cm, and thus, a hardcoat layer having a dried film thickness of 5 μm was formed.

Thus, films 1 to 16 attached with a hardcoat layer including the hardcoat layer on the films 1 to 16 respectively prepared as described above were prepared.

<Preparation of Polarizing Plate>

[Preparation of Polarizer]

Iodine was adsorbed in a stretched polyvinyl alcohol film, and thus, a polarizer having a film thickness of 20 μm was prepared. Furthermore, for example, a method disclosed in Example 1 of JP2001-141926A may be used as a preparation method of the polarizer, or a PVA layer formed on an amorphous PET substrate may be stretched and prepared as a polarizing film (1) as disclosed in JP2013-008019A.

[Preparation of Polarizing Plate Used in Liquid Crystal Display Device 3]

(Preparation of Polarizing Plate Using Bonding Method A)

—Adhesive Agent for Polarizing Plate—

100 parts by mass of 2-hydroxy ethyl acrylate, 10 parts by mass of tolylene diisocyanate, and 3 parts by mass of a photopolymerization initiator (IRGACURE 907, manufactured by BASF SE) were formulated, and thus, an adhesive agent for a polarizing plate was prepared.

The film 1 attached with a hardcoat layer and the polarizing plate protective film 1 were prepared, the adhesive agent for a polarizing plate described above was applied onto two films by using a microgravure coater (Gravure Roll: #300, Rotating Speed of 140%/Line Speed) such that the thickness became 5 μm, and thus, an optical film attached with an adhesive agent was obtained. Next, two films were bonded to both surfaces of the polarizer by a roller in a roll-to-roll process such that a polarizer having a film thickness of 20 μm was interposed between the two films attached with an adhesive agent. Ultraviolet irradiation was performed form the bonded optical film side (both sides), and thus, a polarizing plate 1 using a bonding method A was prepared. Furthermore, the line speed was 20 m/min, and the accumulated amount of light of the ultraviolet ray was 300 mJ/cm$^2$. Here, a transmission axis of the polarizer and a transport direction of the film were arranged to be orthogonal to each other. Similarly, polarizing plates 2 to 16 using the bonding method A were prepared by the same preparation of the polarizing plate 1 using the bonding method A except that the films 2 to 16 attached with a hardcoat layer were used instead of the film 1 attached with a hardcoat layer.

(Preparation of Polarizing Plate Using Bonding Method B)

The polarizing plate protective film of each of the examples and FUJITEC TD60UL (manufactured by Fujifilm Corporation) were dipped into an aqueous solution of sodium hydroxide (a saponification liquid) of 4.5 mol/L of which the temperature was adjusted to be 37° C. for 1 minute, and then, the film was washed with water, and after that, the film was dipped into an aqueous solution of a sulfuric acid of 0.05 mol/L for 30 seconds, and then, the film was further washed with water. Then, water drainage was repeated three times by using an air knife, the film was dried in a drying zone at 70° C. by being retained for 15 seconds after the water drainage, and a film which had been subjected to a saponification treatment was prepared.

According to Example 1 of JP2001-141926A, a rotation speed difference was provided between two pairs of nip rolls, the stretching was performed in a longitudinal direction, and thus, a polarizer having a thickness of 20 μm was prepared.

The polarizers obtained as described above, and two films which had subjected to a saponification treatment were selected, the polarizer was interposed between the films, and then, the polarizer was bonded to the two films in a roll-to-roll process such that a polarization axis was orthogonal to a longitudinal direction of the film by using an aqueous solution of PVA (PVA-117H manufactured by KURARAY CO., LTD.) of 3% as an adhesive agent, and thus, a polarizing plates 1 to 16 using a bonding method B were prepared. Here, one film of the polarizer was set to a film in which one film selected from the group consisting of the polarizing plate protective films of each of the examples was subjected to saponification, and the other film was set to a film in which FUJITEC TD60UL was subjected to saponification.

In the polarizing plate protective films of each of the examples, bonding properties with respect to polyvinyl alcohol were sufficient even in a case of using any one of the bonding methods A and B, and polarizing plate processing aptitude was excellent.

(Display Performance Evaluation in IPS Type Liquid Crystal Display Device)

Polarizing Plates interposing a liquid crystal cell therebetween were detached from a commercially available liquid crystal television (a slim 42 type liquid crystal television in an IPS mode), and the polarizing plates prepared by the method described above were rebonded to the liquid crystal cell through a pressure sensitive adhesive agent such that the polarizing plate protective film side of each of the examples was arranged on the liquid crystal cell side. The assembled liquid crystal television was retained in an environment of a temperature of 50° C. and relative humidity of 80% for 3 days, and then, was moved into an environment of a temperature of 25° C. and relative humidity of 60%, lighting was continuously performed in a black display state, and visual observation was performed after 48 hours, and light unevenness was evaluated.

Brightness unevenness at the time of black display in a case of being observed from the front surface of the device was observed, and thus, it was found that unevenness was rarely observed under an environment of illuminance of 100 lx.

EXPLANATION OF REFERENCES

20: film manufacturing line
21: stock tank
22: dope composition
30: filtration device
31: casting die
32, 33: rotating roller
34: metal support
35: tenter type drier
40: selvage cutting device
41: drying chamber
42: cooling chamber
43: winding chamber
60: motor
61: stirrer
62: pump
63: heat medium circulation device
64: casting chamber
65: temperature adjustment equipment
66: condenser
67: collecting device
68: decompression chamber
69: casting film
70, 71, 72, 73: blowing port
74: polymer film
75: peeling roller
80: crossover portion
81: blowing machine
82: film
90: crusher
91: roller
92: adsorption collecting device
93: forced static elimination device (static elimination bar)
94: knurling applying roller
95: winding roller
96: press roller

What is claimed is:

1. A dope composition, containing:
an acrylic resin having a weight average molecular weight of greater than or equal to 250,000; and
a drying additive having a weight average molecular weight of less than 50,000,
wherein the acrylic resin is formed only of a methyl methacrylate unit a,
wherein the drying additive contains a phenol-based compound denoted by General Formula (1) described below; and

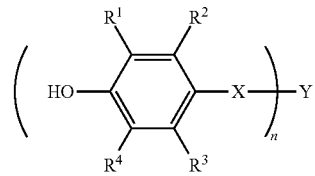

General Formula (1)

in General Formula (1), $R^1$ and $R^4$ each independently represent a hydrogen atom, a methyl group, or a t-butyl group, $R^2$ and $R^3$ each independently represent a hydrogen atom or a methyl group; X represents a divalent organic group formed of a combination of two or more groups selected from the group consisting of —$CH_2$—, —CO—, —O—, and —$NR^5$—, $R^5$ represents a hydrogen atom or an alkyl group; Y represents a hydrogen atom, a carbon atom, a sulfur atom, an aromatic hydrocarbon group, or a hetero ring; and n represents an integer of 1 to 4, wherein the drying additive contains a styrene-based copolymer having a structure unit denoted by General Formula (2) described below and a structure unit denoted by General Formula (3) or (4) described below:

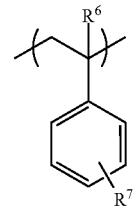

General Formula (2)

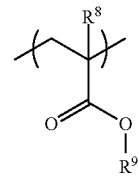

General Formula (3)

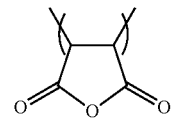

General Formula (4)

in General Formula (2), $R^6$ represents a hydrogen atom or an alkyl group having 1 to 4 carbon atoms, and $R^7$ represents a hydrogen atom, a halogen atom, an alkyl group having 1 to 4 carbon atoms or an alkoxy group having 1 to 4 carbon atoms, and an alkyl carbonyl oxy group having 1 to 4 carbon atoms; and in General Formula (3), $R^8$ represents a hydrogen atom or a methyl group, and $R^9$ represents a hydrogen atom or an alkyl group having 1 to 20 carbon atoms, and wherein the drying additive contains a novolak resin having a structure unit denoted by General Formula (5) described below:

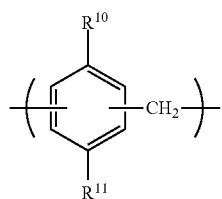

General Formula (5)

in General Formula (5), $R^{10}$ represents a hydroxyl group or an alkoxy group having 1 to 2 carbon atoms, and $R^{11}$ represents a hydrogen atom or an alkyl group having 1 to 8 carbon atoms.

2. The dope composition according to claim 1, wherein the drying additive is contained in the amount of greater than or equal to 5 parts by mass with respect to 100 parts by mass of the acrylic resin.

3. A polarizing plate protective film, comprising: a polymer film obtained by performing film formation with respect to the dope composition according to claim 1.

4. The polarizing plate protective film according to claim 3, wherein diffusion coefficients De and Dn defined by Expression (1) described below satisfy conditions of Expression (2) described below; and $$De=Pe/Se, Dn=Pn/Sn \qquad \text{Expression (1)}$$

$$De/Dn>1 \qquad \text{Expression (2)}$$

in Expressions (1) and (2), Pe represents moisture permeability of the polarizing plate protective film, Se represents an equilibrium moisture content of the polarizing plate protective film at a temperature of 25° C. and relative humidity of 80%, Pn represents moisture permeability of an additive-free film which has the same configuration as that of the polarizing plate protective film except that the additive is not contained, and Se represents an equilibrium moisture content of the additive-free film at a temperature of 25° C. and relative humidity of 80%; and here, the moisture permeability is a value obtained by converting a value after being aged at a temperature of 40° C. and relative humidity of 90% for 24 hours into a film thickness of 40 μm using a method of JIS Z-0208.

5. The polarizing plate protective film according to claim 3, wherein moisture permeability in terms of a film thickness of 40 μm is less than or equal to 70 g/m²/day.

6. A polarizing plate protective film manufacturing method, comprising:
a dissolving step of dissolving the dope composition according to claim 1 in a solvent and preparing a dope;
a casting step of casting the dope onto a metal support and forming a casting film; and
a peeling step of drying the casting film, peeling off the casting film from the metal support, and then, obtaining a polymer film.

7. A polarizing plate, comprising:
the polarizing plate protective film according to claim 3.

8. A liquid crystal display device, comprising:
the polarizing plate according to claim 7.

* * * * *